(12) United States Patent
Nashimoto et al.

(10) Patent No.: US 7,028,137 B2
(45) Date of Patent: Apr. 11, 2006

(54) STORAGE CONTROL SUBSYSTEM FOR MANAGING LOGICAL VOLUMES

(75) Inventors: Kunihiko Nashimoto, Odawara (JP); Akihiro Mori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 100 days.

(21) Appl. No.: 10/795,997

(22) Filed: Mar. 10, 2004

(65) Prior Publication Data

US 2005/0144404 A1  Jun. 30, 2005

(30) Foreign Application Priority Data

Dec. 25, 2003  (JP) .............................. 2003-429793

(51) Int. Cl.
  G06F 12/08  (2006.01)
  G06F 15/167 (2006.01)
  G06F 15/173 (2006.01)

(52) U.S. Cl. .................. 711/112; 709/214; 709/224
(58) Field of Classification Search ................ 711/112, 711/114, 147, 148, 161, 162; 714/5, 6; 709/223–226
See application file for complete search history.

(56) References Cited

U.S. PATENT DOCUMENTS

| 5,257,367 | A | 10/1993 | Goodlander et al. ........ 707/204 |
| 5,388,243 | A | 2/1995 | Glider et al. ................. 710/38 |
| 5,860,137 | A * | 1/1999 | Raz et al. .................... 711/202 |
| 6,681,310 | B1 * | 1/2004 | Kusters et al. .............. 711/202 |
| 6,851,020 | B1 * | 2/2005 | Matsumoto et al. ........ 711/112 |
| 6,854,034 | B1 | 2/2005 | Murakami et al. .......... 711/112 |
| 2002/0091828 | A1 * | 7/2002 | Kitamura et al. ........... 709/226 |
| 2002/0184439 | A1 | 12/2002 | Hino et al. .................. 711/112 |
| 2003/0188119 | A1 * | 10/2003 | Lubbers et al. ............. 711/170 |
| 2003/0191917 | A1 | 10/2003 | McBrearty et al. ......... 711/162 |
| 2003/0196056 | A1 | 10/2003 | Vishlitzky et al. .......... 711/165 |
| 2003/0225861 | A1 * | 12/2003 | Iwamura et al. ............ 709/219 |
| 2004/0148479 | A1 | 7/2004 | Patel et al. .................. 711/163 |

FOREIGN PATENT DOCUMENTS

| JP | 2001-195201 | 7/2001 |
| JP | 2003-99306 | 4/2003 |
| JP | 2003 345638 | 12/2003 |

* cited by examiner

Primary Examiner—Matthew Kim
Assistant Examiner—Shane M. Thomas
(74) Attorney, Agent, or Firm—Mattingly, Stanger, Malur & Brundidge, P.C.

(57) ABSTRACT

The present invention provides a storage control subsystem that facilitates logical volume access management by a host. Before copying, the host instructs a disk array device to identify the states of target logical volumes and collect information in control memory, whereupon the disk array device reads information in the control memory and reports information relating to the target logical volumes to the host.

12 Claims, 15 Drawing Sheets

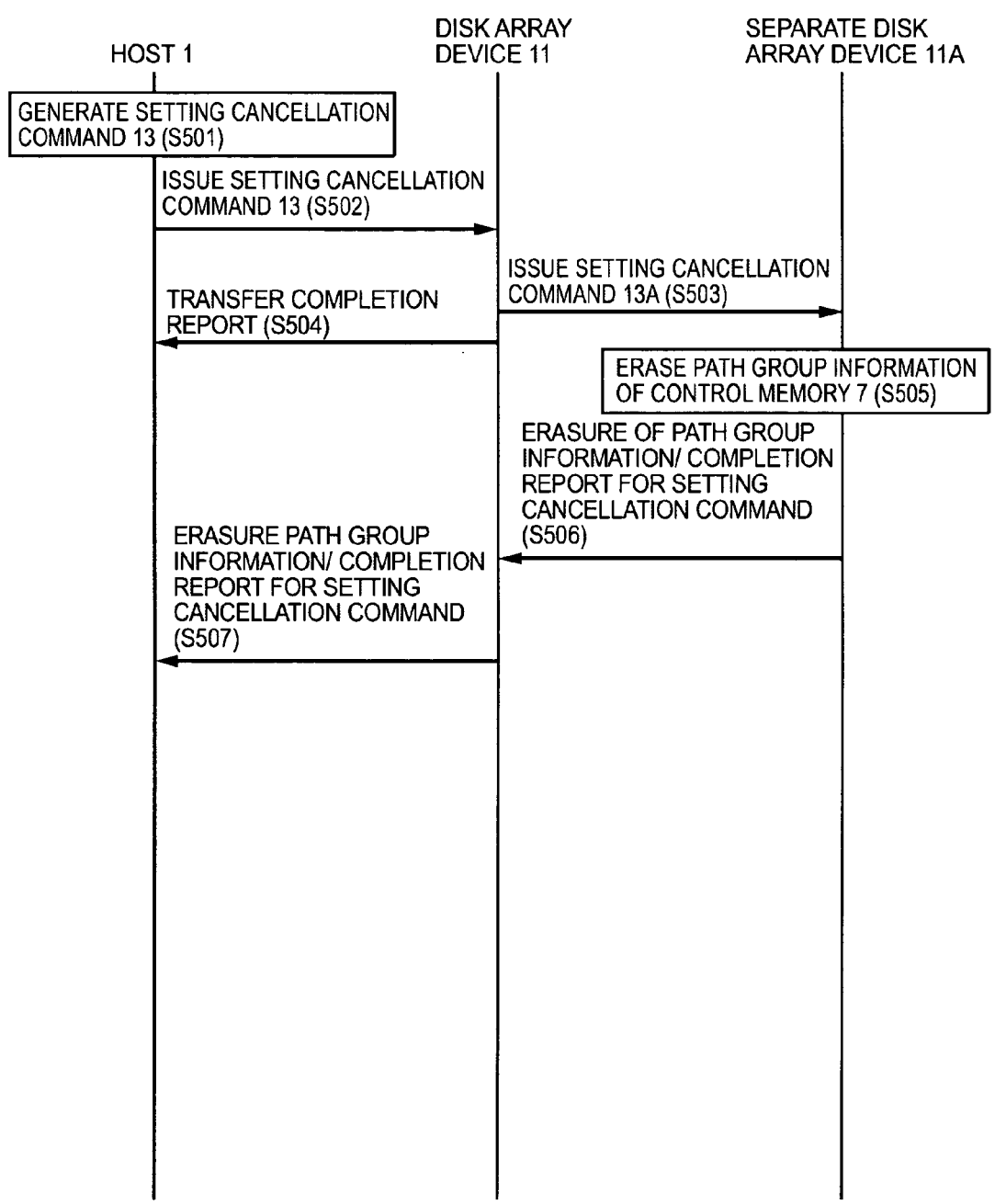

STORAGE CONTROL SUBSYSTEM FOR MANAGING LOGICAL VOLUMES

CROSS-REFERENCE TO RELATED APPLICATIONS

This application relates to and claims priority from Japanese Patent Application No. 2003-429793 filed on Dec. 25, 2003, the entire disclosure of which is incorporated herein by reference.

BACKGROUND OF THE INVENTION

1. Field of the Invention

The present invention relates to a storage control subsystem that comprises one or more storage devices or a logical volume access management method for a storage control subsystem. The present invention also relates to a storage system that comprises a storage control subsystem and a host that is connected to the storage control subsystem.

2. Description of the Related Art

For example, in a business-critical storage system that handles a large volume of data, data is managed by using a storage control subsystem that is formed separately from the host computer (hereinafter referred to simply as the 'host') This storage control subsystem is also known as a disk array device, for example, and is a RAID (Redundant Array of Independent Inexpensive Disks) system that is constituted by arranging a multiplicity of disk-type storage devices in the form of an array.

As an example of a storage system, a technology is known (Japanese Patent Application Laid-Open No. 2001-195201) for collectively changing, with respect to a plurality of volume pairs that are established extending over disk devices controlled by a plurality of disk control devices, the states of all the volume pairs by means of a single state change request from an upper layer host or operating panel or an event-driven state change request that is generated within a single disk control device, irrespective of the number of installed disk control devices, disk devices, and so forth.

Further, in a storage control subsystem, for example, data is copied from a first logical volume to a second logical volume that forms a pair (hereinafter the first logical volume that constitutes the copy source will be called the 'regular volume', while the second logical volume constituting the copy destination will be called the 'subvolume'). In this case, in order to perform copying to the subvolume normally, the subvolume must enter an offline state in which same is not connected to any host. This is because, when data is copied to a subvolume that is in an online state, other data is written from the host to the subvolume during the copying process and hence there is the risk that the data in the subvolume will not be the same as the data in the regular volume.

A method of preventing this risk that may be considered is one in which data is not copied to the subvolume when the subvolume is in an online state.

However, accordingly, when a plurality of regular volumes constitute a single copy source, a plurality of subvolumes constitute a single copy destination, and copying is performed with respect to this plurality of subvolumes, for example, even if just one of the plurality of subvolumes is in an online state, although copying may be performed normally to the other subvolumes in an offline state, copying to subvolumes in an online state is not executed, and therefore data integrity cannot be preserved between the plurality of regular volumes (the copy source) and the plurality of subvolumes (the copy destination).

In order to prevent this situation from arising, before data in a regular volume constituting the target is copied, a subvolume that is paired with this regular volume must enter an offline state. In this case, if the subvolume is connected to at least one host, the user must find the connection-destination hosts of the subvolume individually. In order to find the connection destination hosts, for example, a first user of a first host that outputs a copy command must consult, by telephone or otherwise, second users of a plurality of second hosts that are possibly connected to the subvolume, with regard to which logical volume these second hosts are connected to. Then, once the connection-destination second hosts are known, the second user must render the subvolume offline by breaking the connection of the second hosts with the subvolume.

Likewise, when the subvolume is in the online state, normal copying cannot be executed, and processing that is troublesome for the user is required in order to change the online state of the subvolume to the offline state. This process becomes increasingly difficult as the number of subvolume connection-destination hosts increases.

SUMMARY OF THE INVENTION

Accordingly, the present invention achieves at least any of the following objects:

(1) The provision of a storage control subsystem in which access management of logical volumes by a host is straightforward.

(2) The provision of a storage control subsystem that is highly reliable with respect to data backups.

(3) The provision of a storage control subsystem that has a function enabling path cancellation through access by a host that is not directly connected, such as a host connected via another storage device, for example.

A further object of the present invention is the backing up of data from a regular volume to a subvolume, that is, to allow data to be backed up normally to a database constituted by a plurality of subvolumes, for example.

Yet another object of the present invention is to convert a subvolume in an online state to an offline state easily.

Further objects of the present invention will be readily apparent from the following description.

The storage system according to one aspect of the present invention is a storage system comprising one or more host devices, and a storage control subsystem connected to the one or more host devices. The storage control subsystem comprises a channel control unit that controls communications with the connected host device(s); a plurality of logical volumes prepared on one or more physical storage devices; a disk control unit that controls the plurality of logical volumes; and control memory. Recorded in the control memory for each of the plurality of logical volumes is volume discrimination information, ON/OFF information indicating whether an online state exists, and, in the event of an online state, path group information with regard to which host device(s) the subvolume is connected to. The storage control subsystem (channel control unit, for example) is such that, as a result of receiving a specific command from a certain host device, the channel control unit performs, before a target regular volume and target subvolume among the plurality of volumes are paired and data in the target regular volume is copied to the target subvolume, a first examination of whether the target subvolume is in an online state on the basis of ON/OFF information on the target subvolume, and, when, as a result of this first examination, the target subvolume is known to be in an online state, the channel control unit performs a second examination with regard to which separate host device the target subvolume is connected to on the basis of path group information on the target subvolume; and the result of the second examination is sent from the channel control unit to the certain host device. The host device displays the second examination result (discrimination information for the host connected to the target subvolume, for example). Further, the storage control subsystem may send the first examination result to the certain host device or may send the second examination result without sending the first examination result. Further, the main body that judges whether the target subvolume is in the online state may be the storage control subsystem that acquires the first examination result, the certain host device that received the first examination result, or may be the user viewing the first examination result displayed on the certain host device.

The storage control subsystem according to another aspect of the present invention comprises a channel control unit that controls communications with the connected host device(s); a plurality of logical volumes prepared on one or more physical storage devices; a disk control unit that controls the plurality of logical volumes; and control memory. Volume discrimination information, ON/OFF information indicating whether an online state exists, and, in the event of an online state, path group information with regard to which host device the subvolume is connected to are recorded in the control memory for each of the plurality of logical volumes by predetermined components of the storage control subsystem (the channel control unit and/or device control unit, for example). The storage control subsystem is such that, as a result of receiving a specific command from the host device, the channel control unit performs, before a target regular volume and target subvolume among the plurality of volumes are paired and data in the target regular volume is copied to the target subvolume, a first examination of whether the target subvolume is in an online state on the basis of ON/OFF information on the target subvolume, and, when, as a result of this first examination, the target subvolume is known to be in an online state, the channel control unit performs a second examination with regard to which separate host device the target subvolume is connected to on the basis of path group information on the target subvolume; and the result of the second examination is sent from the channel control unit to the certain host device.

The method according to a further other aspect of the present invention is a method for controlling the storage of data in each of a plurality of logical volumes prepared on one or more physical storage devices, comprising the steps of: recording, in control memory for each of the plurality of logical volumes, volume discrimination information, ON/OFF information expressing whether or not each volume is in an online state, and path group information with regard to which host device a subvolume is connected to if in the online state; receiving a specific command from the host device; performing a first examination of whether a target subvolume is in an online state based on the ON/OFF information on the target subvolume before a target regular volume and the target subvolume among the plurality of volumes are paired and data in the target regular volume is copied to the target subvolume; performing a second examination with regard to which separate host device the target subvolume is connected to based on path group information on the target subvolume when, as a result of the first examination, it is clear that the target subvolume is in the online state; and sending the result of the second examination to the host device.

With the present invention, the user of a certain host device can easily find out which host device(s) the target subvolume is online with, thereby alleviating the burden on the user bringing the volumes offline.

BRIEF DESCRIPTION OF THE DRAWINGS

FIG. 15 shows a sequence of commands between the host 1, disk array device 11, and a separate disk array device 11A for the processing flow illustrated in FIG. 7.

DESCRIPTION OF THE PREFERRED EMBODIMENTS

An embodiment of the present invention will be described hereinbelow with reference to the drawings.

Figure 1:
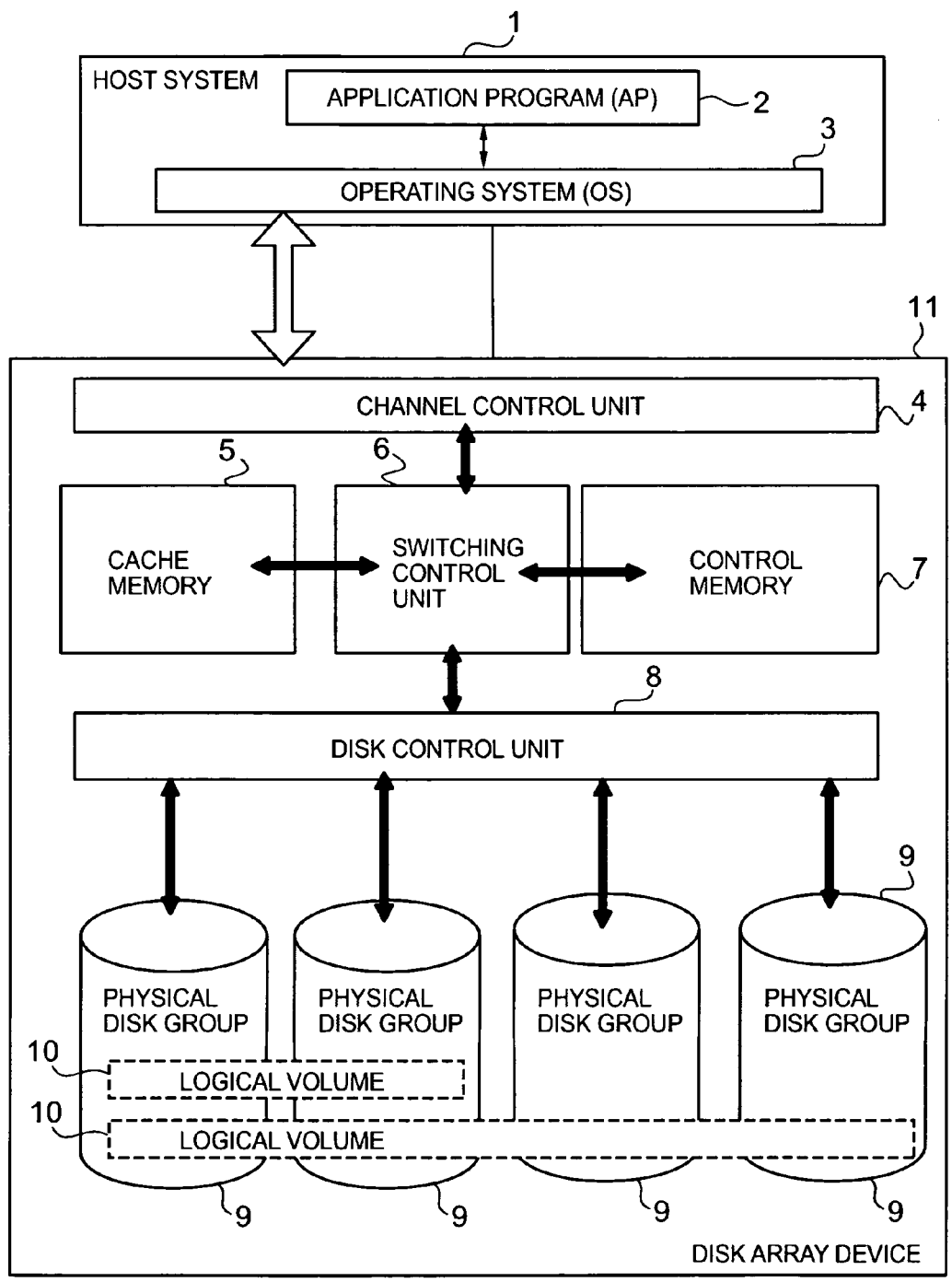
FIG. 1 is a block diagram showing the overall constitution of a storage system pertaining to an embodiment of the present invention.

FIG. 1 shows the overall constitution of a storage system pertaining to an embodiment of the present invention.

This storage system comprises a disk array device 11 (RAID, for example), and one or more host systems 1 (hereinafter referred to simply as 'host 1') connected to the disk array device. Here, the disk array device 11 connected to the host 1 may be connected to another disk array device, a plurality of disk array devices 11 may be connected to a single host 1, or a plurality of hosts 1 may be connected to a single disk array device.

The host 1 is a personal computer, a workstation, or the like, for example, and is a computer system comprising, as hardware resources, a CPU (Central Processing Unit), non-volatile and/or volatile memory (ROM or RAM, for example), and a hard disk, or the like. A variety of functions may be implemented by the CPU of the host 1 reading and running various programs. The host 1 is connected to the disk array device 11 via a communication network such as a LAN (Local Area Network) or SAN (Storage Area Network), or the like, for example.

As shown in FIG. 1, the host 1 comprises one or a plurality of application programs (hereinafter called 'AP') 2, and an operating system (called 'OS' hereinafter) 3. The AP2 issues a variety of commands, such as a command to form a volume pair in which a first logical volume is a regular volume and a second logical volume is a subvolume and then copy data in the regular volume to the subvolume, to the disk array device 11 via the OS3. Further, the AP2 issues an I/O request, which contains a command type (a read request or write request, for example), and a LUN for a logical volume that is a read data reading destination or a write data storage destination, to the disk array device 11 via the OS3.

The disk array device 11 comprises one or more physical disk groups 9 having a plurality of disk-type storage devices arranged in the form of an array, and a plurality of logical volumes (Logical Units) 10, which are logical storage regions, are established in a physical storage region provided by these physical disk groups 9. The disk array device 11 comprises a channel control unit 4, cache memory 5, control memory 7, a disk control unit 8, and a switching control unit 6.

The channel control unit 4 controls communication with the connection destination host 1 and comprises one or a plurality of channel adapter sets (not shown). Each channel adapter set contains a plurality of channel adapters (typically two) connected to one or more host(s) 1. These adapters are constituted in substantially the same way. Accordingly, for example, when the host 1 has been unable to access a logical volume 10 via one channel adapter, access is gained to the same logical volume 10 via the other channel adapter. Each channel adapter can be constituted by a hardware circuit, software, or a combination thereof, and data communications between the disk array device 11 and host 1 are performed. Mounted in the channel adapter are one or more microprocessors (not shown) (hereinafter called 'channel processors') connected to one or more hosts 1, a microprocessor adapter (not shown) (hereinafter abbreviated to 'MPA') connected to the control memory 7, and a data transfer adapter (not shown) (hereinafter abbreviated to 'DTA') connected to the cache memory 5. When a channel processor sends and receives control information (messages to and from the processor, for example) to and from an external microprocessor (more specifically, a microprocessor (not shown) on a disk adapter (described later)), control information is sent and received via the MPA. Further, when data is written from the host 1 to the logical volume 10 (hereinafter this written data will be called 'write data'), and when data read from the logical volume 10 (hereinafter this read data will be called 'read data') is output from the disk array device 11 to the host 1, the write data and read data pass through the DTA. For example, each channel processor performs poling of predetermined storage regions of the control memory 7 to acquire control information via the MPA, stores various commands received from the host 1 in the control memory 7, reads read data stored in the cache memory 5 and sends this data to the host 1, and stores write data received from the host 1 in the cache memory 5.

The cache memory 5 is volatile or nonvolatile memory. Write data that is transferred from a channel adapter to a disk adapter of a subsequently described disk adapter set, and read data that is transferred from the disk adapter to the channel adapter are temporarily stored in the cache memory 5.

The control memory 7 is nonvolatile or volatile memory that is shared by the channel control unit 4 and disk control unit 8.

The disk control unit 8 controls each physical disk group 9 and comprises a disk adapter set (not shown) that is prepared for each physical disk group 9. A disk adapter set comprises a plurality of disk adapters (typically two). Each disk adapter comprises one or a plurality of microprocessors (not shown) (hereinafter called 'disk processors') and reads or writes data to the logical volume 10 that has the logical volume number (abbreviated as 'LUN' hereinafter) designated by the host 1, by means of the disk processor processing (the logical volume 10 may also be discriminated by a code other than a LUN).

The switching control unit 6 can be constituted as a high-speed path such as an ultrafast crossbar switch or the like that performs a data transmission by means of a high-speed switching operation, for example. The switching control unit 6 communicably connects the channel control unit 4 (channel adapters), the disk control unit 8 (disk adapters), the control memory 7, and the cache memory 5 to one another. The transfer of data or commands between these channel adapters, disk adapters, control memory 7, and cache memory 5 is performed via the switching control unit 6.

An outline of the disk array device 11 pertaining to this embodiment was provided above. The disk array device 11 receives an I/O request from the AP2 of the host 1 and executes processing based on the content of this I/O request.

An outline of the processing flow of the I/O request of the disk array device 11 will be provided below. Further, in this description, a case where the issued I/O request indicates a read request and a case where a write request is indicated will be described separately. This I/O request contains the LUN of the logical volume constituting a read-data reading destination or a write data storage destination.

(1) When the I/O Request Indicates a Read Request.

The channel control unit 4 receives the I/O request issued by the host 1 and determines whether the data to be read as per the I/O request (that is, the read data) exists in a predetermined storage region (predetermined cache slot) of the cache memory 5.

When the result of this determination is affirmative, that is, when the read data exists in the predetermined cache slot (in the case of a cache hit), the channel control unit 4 acquires the read data from the predetermined cache slot and sends this read data to the host 1.

On the other hand, when the result of this determination is negative, that is, when the read data do not exist in the predetermined cache slot (in the case of a cache miss), the channel control unit 4 stores, in the control memory 7, control information for instructing that read data in the logical volume (hereinafter called the 'target volume') 10 to which the LUN included in the I/O request has been allocated be read to a predetermined cache slot temporarily. As a result of the disk control unit 8 reading the control information, read data is read from the target volume 10 and stored in the predetermined cache slot by the disk control unit 8. Thereafter, the channel control unit 4 acquires the read data from the cache memory 5 and sends this data to the host 1.

(2) When the I/O Request Indicates a Write Request.

The channel control unit 4 receives an I/O request containing write data from the host 1 and determines whether data exists in a predetermined cache slot in the cache memory 5.

When the result of this determination is affirmative, that is, when the data exists in the predetermined cache slot (in the case of a cache hit), the channel control unit 4 overwrites data in the predetermined cache slot with the write data contained in the I/O request.

On the other hand, when the result of this determination is negative, that is, when the data does not exist in the predetermined cache slot (in the case of a cache miss), the channel control unit 4 stores, in the control memory 7, control information for instructing that data be read from the target volume 10 and temporarily stored in the predetermined cache slot. Upon reading the control information, the disk control unit 8 reads data from the target volume 10 and stores this data in the predetermined cache slot. The channel control unit 4 overwrites write data contained in the received I/O request with the data stored in the predetermined cache slot.

Thus, this write request ends when write data has been written to the cache memory 5, and hence a completion report is sent back to the host 1 by the disk array device 11. Generally speaking, this data is not reflected in the target volume 10 at the moment the write data is written to the cache memory 5. Rather, write data is read from the cache memory 5 and then written to the target volume 10 by the disk control unit 8.

An outline of the storage system pertaining to this embodiment was provided above. In this storage system, the disk control unit 8 and each physical disk group 9 may be directly connected, or indirectly connected via a network, for example. The physical disk groups 9 and disk control unit 8 may also be formed integrally. Further, one logical volume 10 may be allocated to each channel adapter of the channel control unit 4, or one logical volume 10 may be allocated by a plurality of channel adapters. One logical volume 10 may also be shared by a plurality of channel adapters. In addition, a separate disk array device 11A may be connected to the disk array device 11 as described subsequently. In this case, for example, a regular volume that exists in the disk array device 11 and a subvolume that exists in the separate disk array device 11A are paired such that the host 1 connected to the disk array device 11 may access the subvolume in the separate disk array device 11A via the disk array device 11.

The principal parts of the system pertaining to this embodiment will be described in detail below.

In this embodiment, a plurality of regular volumes constitute one copy source CU (Control Unit: a unit constituting an aggregate of a plurality of logical volumes 10), while a plurality of subvolumes constitute one copy destination CU. Typically, the number of regular volumes constituting a copy source CU and the number of subvolumes constituting a copy destination CU are the same, and a plurality of volume pairs each constituted by one regular volume and one subvolume are individually formed. Therefore, after each of the regular volumes in the copy source CU has been paired with one of more subvolumes in a copy destination CU, data is copied from the copy source CU to the copy destination CU.

Although not illustrated, a CU management table in which discrimination information for each CU (CU numbers, for example), and the LUN of each logical volume contained in these CUs appear, is stored in the control memory 7.

Furthermore, a plurality of control memory address information items that correspond with a plurality of LUN (logical volume numbers) are prepared in the control memory 7 and a LU control table (not shown) corresponding with each LUN is prepared in the locations indicated by each control memory address information item. In each LU control table, a variety of information relating to the corresponding logical volume 10, such as ON/OFF information indicating an online state or offline state (a single bit that is '0' or '1', for example), discrimination information on each connected host connected to the logical volume (the name, for example), discrimination information for each logical path linking each host with the logical volume (the logical path number, for example), and information indicating whether this path is online, for example, are registered by the channel control unit 4 and/or the disk control unit 8. Further, a logical path is a path formed logically within a physical path.

The AP2 of the host 1 sends, to the disk array device 11, a copy command (a command to form respective volume pairs consisting of each regular volume in the copy source CU and each subvolume in the copy destination CU, and to copy data from the copy source CU to the copy destination CU), or a recopy command (a command to form each volume pair once again after each volume pair has been cancelled and then copy data in the copy source CU (only updated data, for example) to the copy destination CU, or the like, in accordance with user operations. Before sending this copy command, recopy command, or the like, the AP2 is able to send an examination command allowing the disk array device 11 to inquire whether all the subvolumes in the copy destination CU are in an offline state. Further, the AP2 is also able to send an examination command allowing the disk array device 11 to inquire which separate host(s) 1 subvolumes designated by the user are connected to. In addition, the AP2 is also able to send a setting cancellation command (described later) to compulsorily convert a subvolume in an online state into an offline state.

Figure 2:
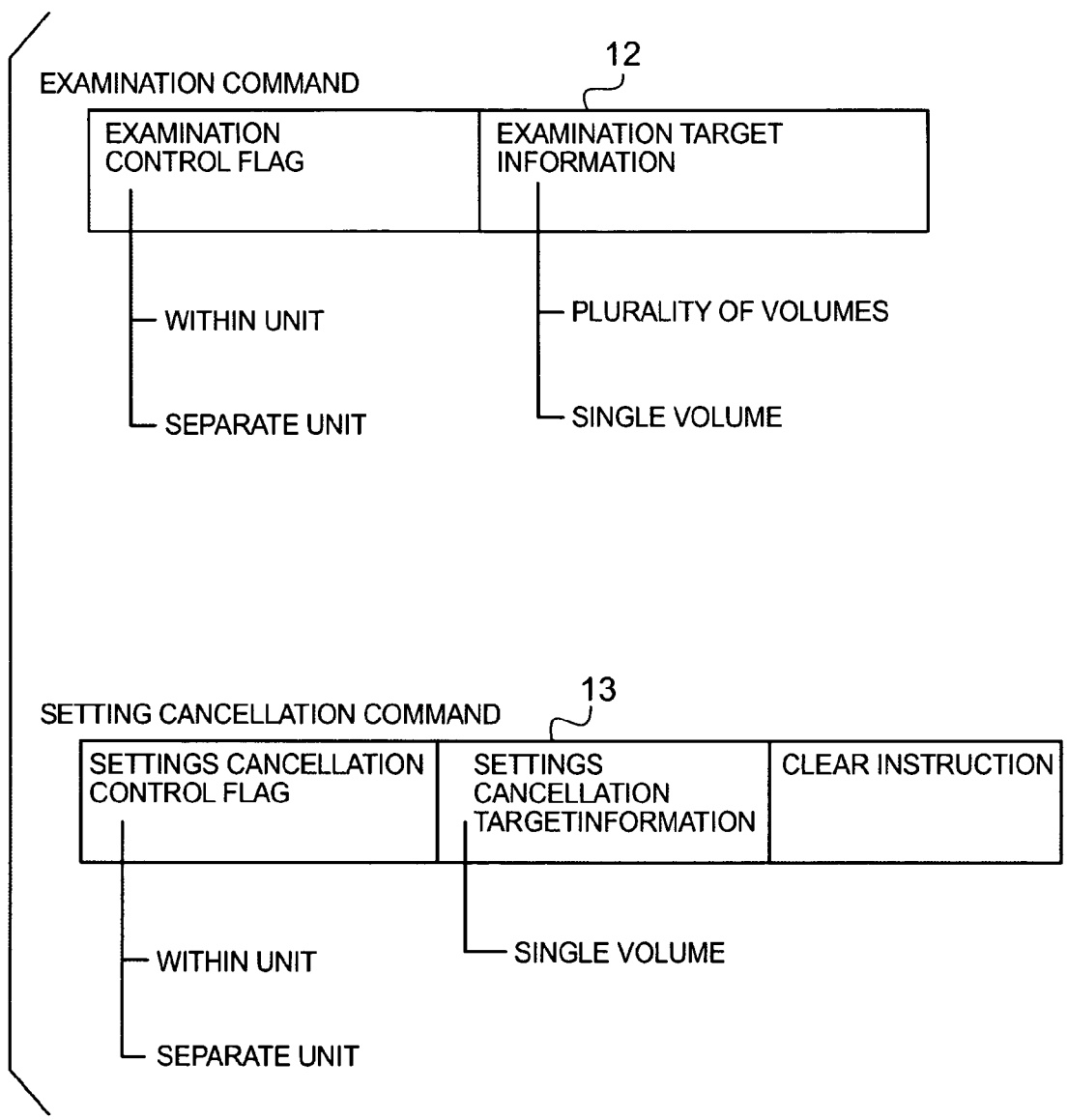
FIG. 2 shows an examination command and setting cancellation command that are issued by an AP2 of a host 1.

FIG. 2 shows an examination command and setting cancellation command that are issued by the AP2 of the host 1.

The examination command 12 is a command that causes the disk array device 11 to execute an examination that is executed in accordance with the content of the command 12 by the channel control unit 4 that receives the command 12. The examination command 12 contains an examination control flag and examination target information.

An 'examination control flag' is information indicating which disk array device the command is issued to. More specifically, for example, this is a code indicating whether the host 1 accesses the connection-destination disk array device 11 or accesses one or more separate disk array devices connected to the disk array device 11. Here, a separate disk array device is a disk array device connected to the disk array device 11 for data recovery, data backups, and so forth, for example (naturally, the connection object is not limited to this disk array device). When a code indicating 'within unit' is contained in the examination control flag, this signifies that a command is issued to the connection-destination disk array device 11 of the host 1 and an examination is executed by the device 11 in accordance with this command. When a code indicating 'separate unit' is contained in the examination control flag, this signifies that a command is sent to a separate disk array device and that an examination is executed by the separate disk array device in accordance with this command. Further, when there is a plurality of separate disk array devices, discrimination information on the separate disk array device is contained in the examination control flag, and thus a separate disk array device constituting a command issue destination may be discriminated by the connection-destination disk array device 11 by means of this discrimination information.

'Examination target information' includes parameter information for confirming at what location the channel control unit 4 receiving the examination command 12 may access the control memory 7.

More specifically, for example, when the examination command 12 for obtaining online information for all the logical volumes 10 contained in a certain CU (information indicating whether the logical volumes 10 are online or offline by means of a bitmap of '0' or '1' for each LUN), the examination target information contains codes signifying 'a plurality of volumes' and CU discrimination information (in addition to or instead of the CU discrimination information, the examination target information may contain a plurality of LUN corresponding with the plurality of logical volumes). In such a case, the channel control unit 4 is able to specify a plurality of LUN corresponding with the CU that has the CU discrimination information by using this CU discrimination information to reference the control memory 7, and is able to reference a plurality of LU control tables corresponding with the specified plurality of LUN.

Further, for example, when the examination command 12 is for obtaining path group information on a certain logical volume 10, for example, the examination target information contains codes signifying a 'single volume' and the LUN of the logical volume 10 that is the target. Here, the channel control unit 4 is able to reference the LU control table corresponding with the LUN.

The setting cancellation command 13 is a command for canceling certain settings for the disk array device that is the command issue destination. The setting cancellation command 13 contains a cancellation control flag, cancellation target information, and a clear instruction.

A 'cancellation control flag' is the same as the examination control flag contained in the examination command 12.

'Cancellation target information' is the same as the examination target information contained in the examination command 12. For this reason, the channel control unit 4 that receives the setting cancellation command 13 is able to specify one or a plurality of target LUN by referencing cancellation target information and is able to access and reference the LU control table corresponding with the specified LUN.

A 'clear instruction' is a code signifying the cancellation of certain settings of the LU control table specified from the cancellation target information. More specifically, the cancellation control flag signifies 'within unit', for example, and, when the cancellation target information contains the LUN of a certain single logical volume 10, the clear instruction signifies the cancellation of the online state of the logical volume 10. The channel control unit 4, which has received the setting cancellation command 13 that includes this clear instruction changes the ON/OFF information that is written in the LU control table corresponding with the specified LUN from an online state '0' to an offline state '1'.

The above examination command 12, setting cancellation command 13, or the like, is issued by the AP2 of the host 1 and reaches the channel control unit 4 of the disk array device 11. When the received command is an examination command 12 and executes processing in accordance with this examination command 12, the channel control unit 4 generates a control table (that is, examination result information) such as that below by extracting the information required from the LU control table of the control memory 7, and sends this control table to the host 1, which is the source of the examination command 12.

Figure 3:
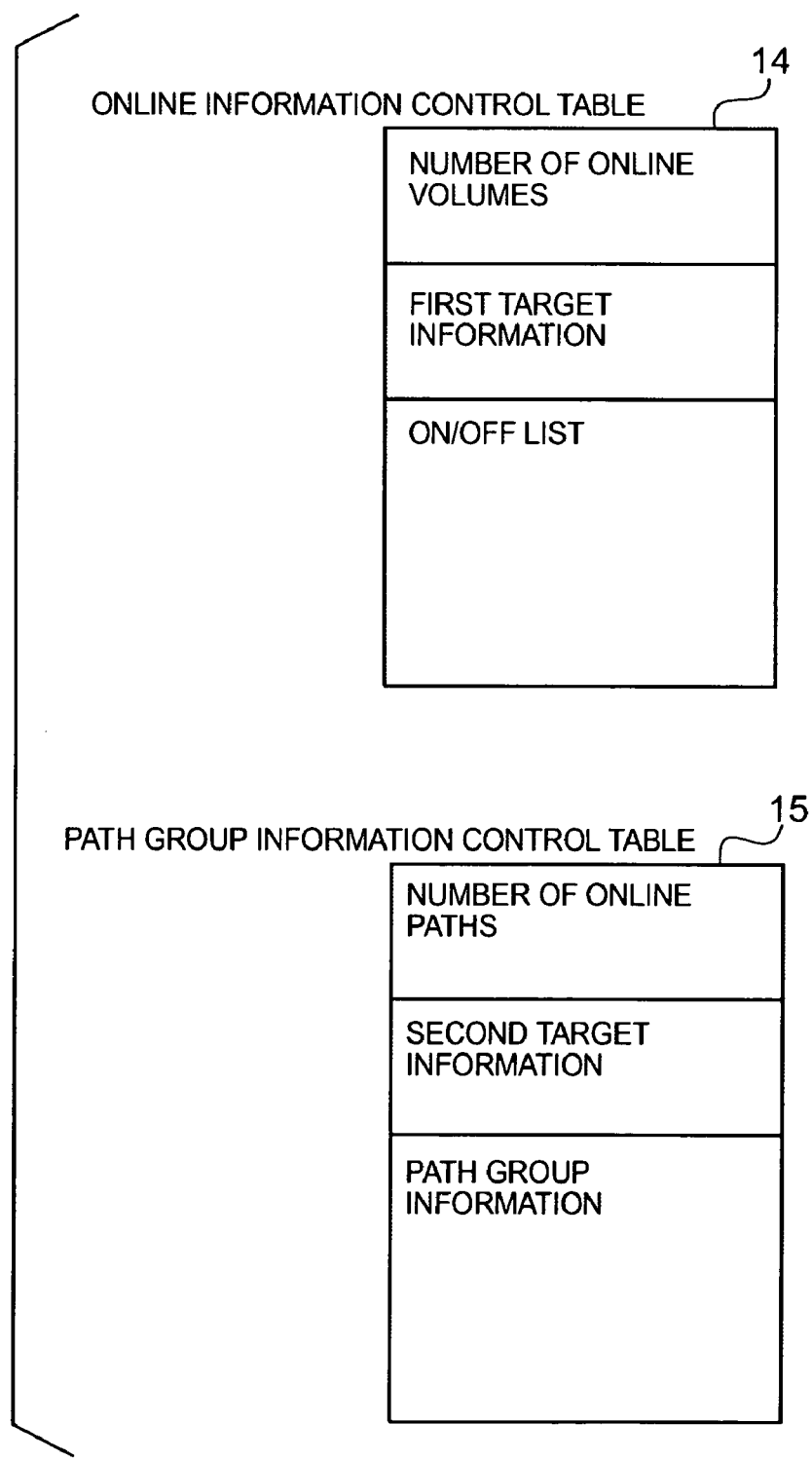
FIG. 3 shows control tables that are generated by a channel control unit 4.

FIG. 3 shows the generated control tables.

The control table generated by the disk array device 11 (including the earlier-mentioned separate disk array device) includes an online information control table 14 and a path group information control table 15. After being generated, the control tables 14 and 15 are sent to the host 1.

The online information control table 14 is generated in CU units. The number of online volumes, first target information, an ON/OFF list, and so forth, are recorded in the online information control table 14 of each CU.

The 'number of online volumes' is the number of logical volumes in an online state that are contained in the target CU. The user is thus able to identify which of the plurality of volumes constituting the target CU is in an online state by referring to the number of online volumes.

'First target information' is address information relating to a group containing the logical volumes contained in the target CU. This address information contains, for example, the SSID (Sub System ID: ID of each subunit produced by further logical division of the CU into a plurality) of the target CU, the product number of the disk array device with each volume in the target CU, the CU number of the target CU, and so forth. The user is able to identify the address information relating to the group with each logical volume in the target CU by referencing this first target information.

The 'ON/OFF list' is a list that indicates a plurality of logical addresses that correspond with a plurality of logical volumes present in the target CU (a bit map showing a '0' if the corresponding logical volume is in an online state and a '1' if this volume is in an offline state). More specifically, for example, when 256 logical volumes 10 exist in the target CU, for example, the ON/OFF list is 32-byte information with 256 one-bit information items corresponding with the 256 logical volumes 10. The user is able to identify whether a volume in an online state exists in the target CU by referencing this ON/OFF list.

The path group information control table 15 is generated in logical volume units. The path group information control table 15 of each logical volume contains the number of online paths, second target information, path group information, and so forth.

'The number of online paths' is information indicating how may paths have been set in the target volume. The channel control unit 4 references the LU control table of the target volume (table registered in the control memory 7), captures the logical paths in an online state, and registers the number of captured logical paths as the number of online paths. The user is thus able to identify the number of hosts connected to the target volume by referencing the number of online paths.

'Second target information' is information arrived at by adding address information (the LUN and/or path to the target volume, for example) relating to the target volume itself to the first target information contained in the volume online information control table 14.

'Path group information' indicates information relating to a logical path between the target volume and a host connected to the target volume. More specifically, for example, 'path group information' denotes the number of a logical path set in the target volume, and path group attribute information. For example, the logical path number is the number of an online logical path, and, more specifically, whether the logical path is online or not is expressed by the binary digits 1 and 0 (0: online, an 1: offline), and these bits are expressed in the format of a bitmap for the number of logical paths that can exist in the disk array device 11. The path group attribute information expresses, for example, the validity or invalidity of a path group and a multipath group or a single-path group by means of a binary bitmap. More specifically, for example, the path group attribute information expresses path group invalidity/validity in bit position 0 (bit position 0=0: path group is invalid; bit position 0=1: path group is valid), and expresses a multipath group or single-path group in bit position 1 (bit position 1=0: multipath group, bit position 1=1: single-path group). In addition, for example, the name of a connected host is expressed in the path group attribute information by means of a predetermined method (a bitmap, for example).

The channel control unit 4 references the LU control table of the target volume (table registered in the control memory 7), captures predetermined items such as online host discrimination information (the host name, for example), and registers the name of the host (or other host discrimination information), and so forth, as path group information on the basis of the predetermined items thus captured. The user is able to identify whether there is a single host or a plurality of hosts connected to the target volume, as well as the name of the connected host(s), and so forth, by referencing the path group information.

The online information control table 14 and the path group information control table 15 were described above.

Next, an outline of the first to fourth processing flows, which are executed when the AP2 issues the above copy command of the storage system pertaining to the present embodiment, will be provided.

Figure 4:
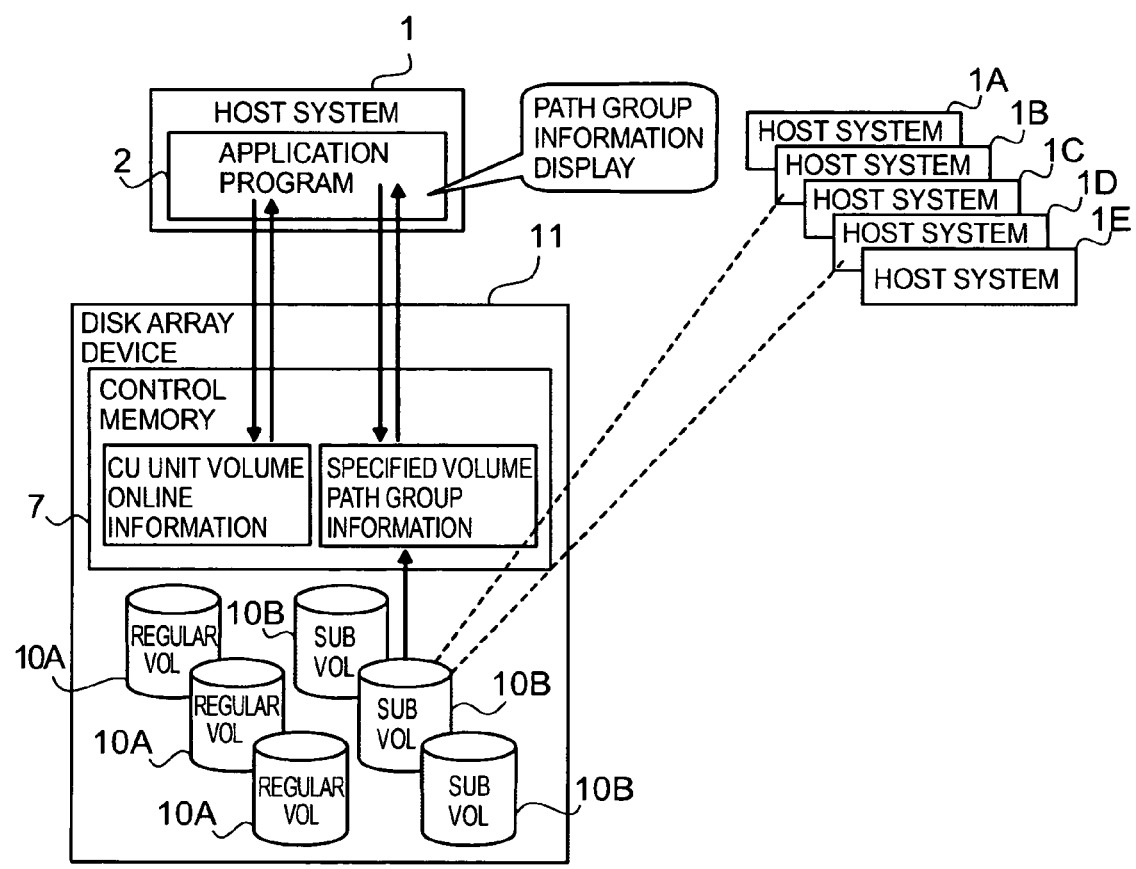
FIG. 4 shows an outline of a first processing flow executed when the AP2 issues a copy command.

First, an outline of the first processing flow will be provided with reference to FIG. 4.

A plurality of CU numbers, and an LU management table, in which two or more LUN corresponding with each CU number are recorded, exist in a predetermined storage region of the host 1 (a certain directory on the hard disk, for example). For example, the two or more (256, for example) LUN corresponding with each CU number are consecutive (by way of example, the 256 LUN corresponding with a certain CU number are '0' to '255', and the 256 LUN corresponding with the next CU number are '256' to '511').

The AP of the host 1 (hereinafter called the 'host AP') 2 receives copying requests. When a copying request is received, the host AP2 receives an input of predetermined required parameters, such as the CU number of the copy source CU and one or more optional LUN in this CU, the CU number of the copy destination CU and one or more optional LUN in this CU, as well as which LUN of the copy source is to be paired with which LUN of the copy destination. Further, when a single LUN is input to the copy source and/or the copy destination, the host AP2 may reference the LU management table and specify the CU number including the inputted LUN, or this CU number may be input automatically. The host AP2 may also issue a predetermined report to the user if a LUN not included in the CU number is not input.

Further, once copying has been designated by the user when the above required parameters have been input, the host AP2 performs the following processing before generating a copy command (or recopy command) containing the required parameters thus input and issuing this command to the disk array device 11.

The host AP2 generates an examination command 12 with target information that includes information with the CU number of the copy destination CU (subvolume group) inputted by the user and relaying the fact that there is a plurality of subvolumes, and information indicating 'within unit' as the control flag. The host AP2 then sends this examination command 12 to the connection-destination disk array device 11 of the host 1.

Upon identifying from the received examination command 12 that the control flag is 'within unit' and that a CU number is included in the target information, the channel control unit 4 of the disk array device 11 accesses the control memory 7, specifies a plurality of LUN corresponding with the CU number, and references the plurality of LU control tables corresponding with the specified plurality of LUN. Then, the channel control unit 4 extracts a plurality of ON/OFF information items (0 or 1 one-bit information items) from the plurality of LU control tables thus referenced, and generates an online information control table 14 corresponding with the target CU (that is, a copy-destination subvolume group), on the basis of the extracted plurality of ON/OFF information items, the CU number and plurality of LUNs, and so forth. The channel control unit 4 then sends the generated online information control table 14 to the host 1.

When the number of online volumes recorded in the online information control table 14 thus received is one or more, the host AP2 references the LU management table, and, by comparing one or more LUN inputted by the user beforehand with the ON/OFF list recorded in the table 14, makes an ON/OFF judgment of whether the subvolume 10B with the LUN inputted by the user is in the online state (the LUN corresponding with each bit can be specified depending on what number from the start or end each bit is in the ON/OFF list).

If the result of this ON/OFF judgment is that all the subvolumes 10B with the LUN inputted by the user are in the offline state (or the number of online volumes recorded in the online information control table 14 is zero), the host AP2 generates a copy command that contains the required parameters inputted by the user and issues this copy command to the disk array device 11.

On the other hand, if the result of this ON/OFF judgment is that there is even one online LUN among the one or more LUN inputted by the user, the host AP2 displays this fact. Further, the host AP2 responds to a command from the user (or immediately without consulting the user once the existence of an online LUN has been identified), an examination command 12 for obtaining path group information is generated for each subvolume that is specified as being online. That is, the host AP2 separately generates, for each subvolume specified as being online, an examination command 12 that has information indicating 'within unit' as a control flag and target information relaying the fact that this is a single volume and containing the LUN of this subvolume. The host AP2 then sends each generated examination command 12 to the connection-destination disk array device 11 of the host 1. Further, here, the designation of a single volume by the target information of the examination command 12 need not necessarily be generated based on the information of the received online information control table 14. The target information may simply contain the LUN desired by the user for which path group information is desired, for example.

When it is identified from the received examination command 12 that the control flag is 'within unit' and the target information indicates a single volume and contains the LUN of this volume, the channel control unit 4 of the disk array device 11 accesses the control memory 7 to reference the LU control group corresponding with this LUN. Then, the channel control unit 4 acquires the names of one or more connected hosts from the referenced LU control table, generates a path group information control table 15 with path group information that contains these one ore more connected-host names, and then sends this path group information control table 15 to the host 1.

Based on the received path group information control table 15, the host AP2 displays path group information (information containing then names of the hosts connected to the subvolume) for each online subvolume on the user interface of the host 1.

According to this processing flow, before the copy source volume and copy destination volume desired by the user are paired and data is copied, an ON/OFF judgment of whether the subvolume designated by the user is in an online state is performed. If the result of this ON/OFF judgment is that the subvolumes designated by the user are all in an offline state, copying is executed, and, if even one online subvolume is present among the designated subvolumes, copying is not executed and an examination regarding the path group information for the online subvolume is made and displayed on the host 1. By viewing this path group information, the user is then able to specify easily which separate host(s) 1 is (are) connected to the subvolume. Stating this using the illustrated example, it can be seen from the online information control table 14 received by way of response to the first examination command 12, that one subvolume 10B is in an online state, and it is clear from the path group information control table 15 received by way of response to the second examination command 12 that, of the hosts 1A to 1E separate from host 1, hosts 1B and 1D are connected to the single subvolume 10B.

Further, in the above processing flow, when it is detected that even one online LUN is present among the copy destination LUNs inputted by the user, the host AP2 may issue an examination command 12 for acquiring path group information for each online subvolume automatically with or without consulting the user (this is the same as the third processing flow described subsequently).

Figure 12:
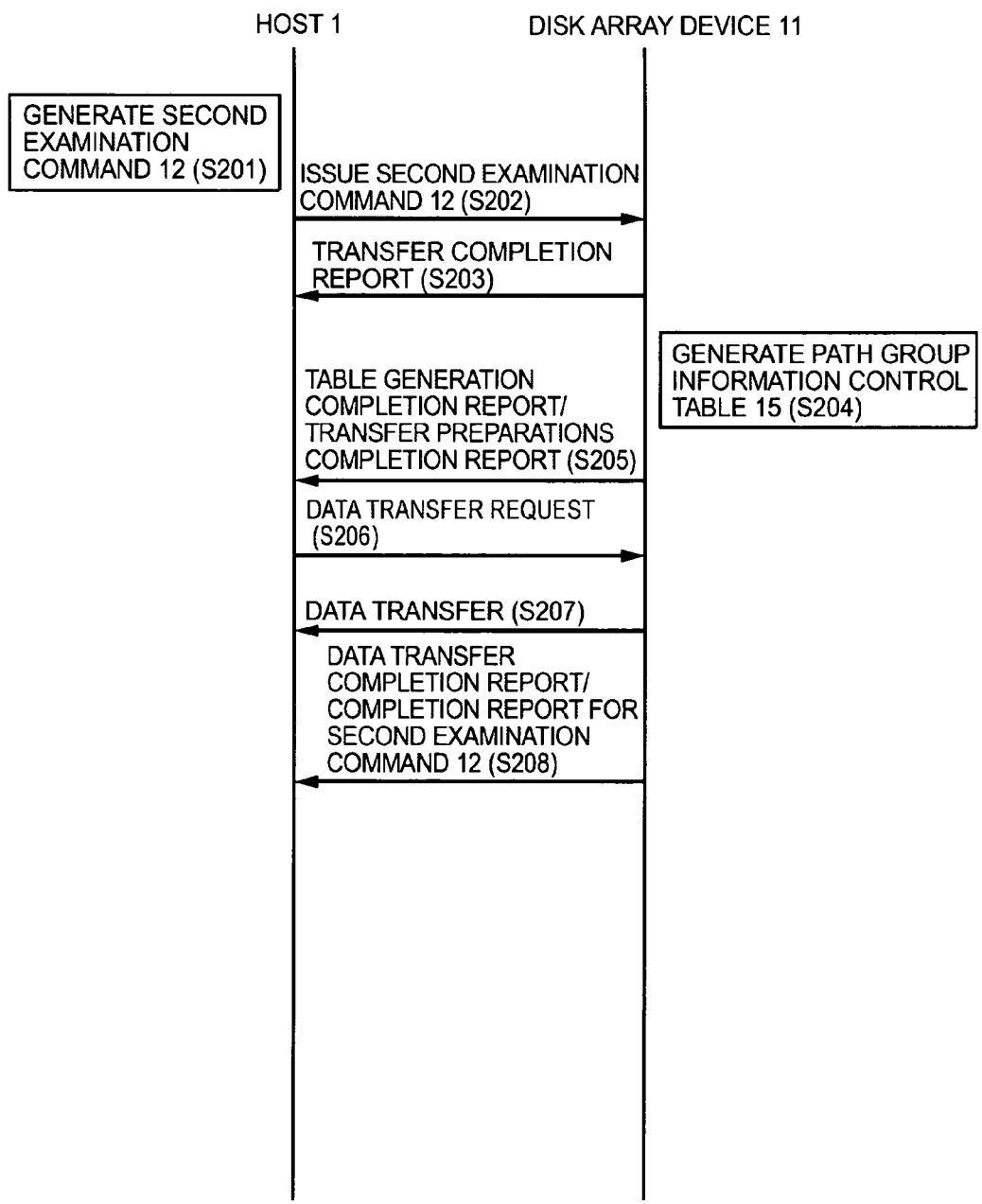
FIG. 12 shows a sequence of commands between the host 1 and disk array device 11 in the processing flow illustrated in FIG. 4.

FIG. 12 shows a sequence of commands between the host 1 and disk array device 11 in the processing flow illustrated in FIG. 4. The content of the command sequence in FIG. 12 will be described below for the respective processing of S201 to S208.

S201:

The host 1 generates a second examination command 12 in order to obtain path group information on the logical volume 10 contained in the CU (information containing names of hosts connected to the subvolume). In the second examination command 12 of this case, 'within unit' is designated as the control flag, and 'single volume' is designated as the target information (further, as it is generated here, in the case of the first examination command 12 for obtaining online information for the logical volume 10 in the target CU, 'within unit' is designated in this command 12 as the control flag, and 'plurality of volumes' is designated as the target information.

S202:

The host 1 issues the generated second examination command 12 (or first examination command 12) to the disk array device 11.

S203:

The disk array device 11 reports the completion of the transfer of the second examination command 12 (or first examination command 12) to the host 1.

S204:

The disk array device 11 generates the path group information control table 15 (or online information control table 14).

S205:

The disk array device 11 issues a completion report to the effect that the generation of the path group information control table 15 (or online information control table 14) is complete, and a data-transfer preparations completion report to the host 1.

S206:

The host 1 issues a request to transfer the data of the path group information control table 15 (or online information control table 14) to the disk array device 11.

S207:

The disk array device 11 transfers the data of the generated path group information control table 15 (or online information control table 14) to the host 1.

S208:

The disk array device 11 issues a normal completion report for the data transfer of the path group information control table 15 (or online information control table 14) and a completion report for the second examination command (or first examination command) 12 to the host 1.

As a result of this command sequence, the host 1 issues a command to the disk array device 11 and receives the data requested.

Figure 5:
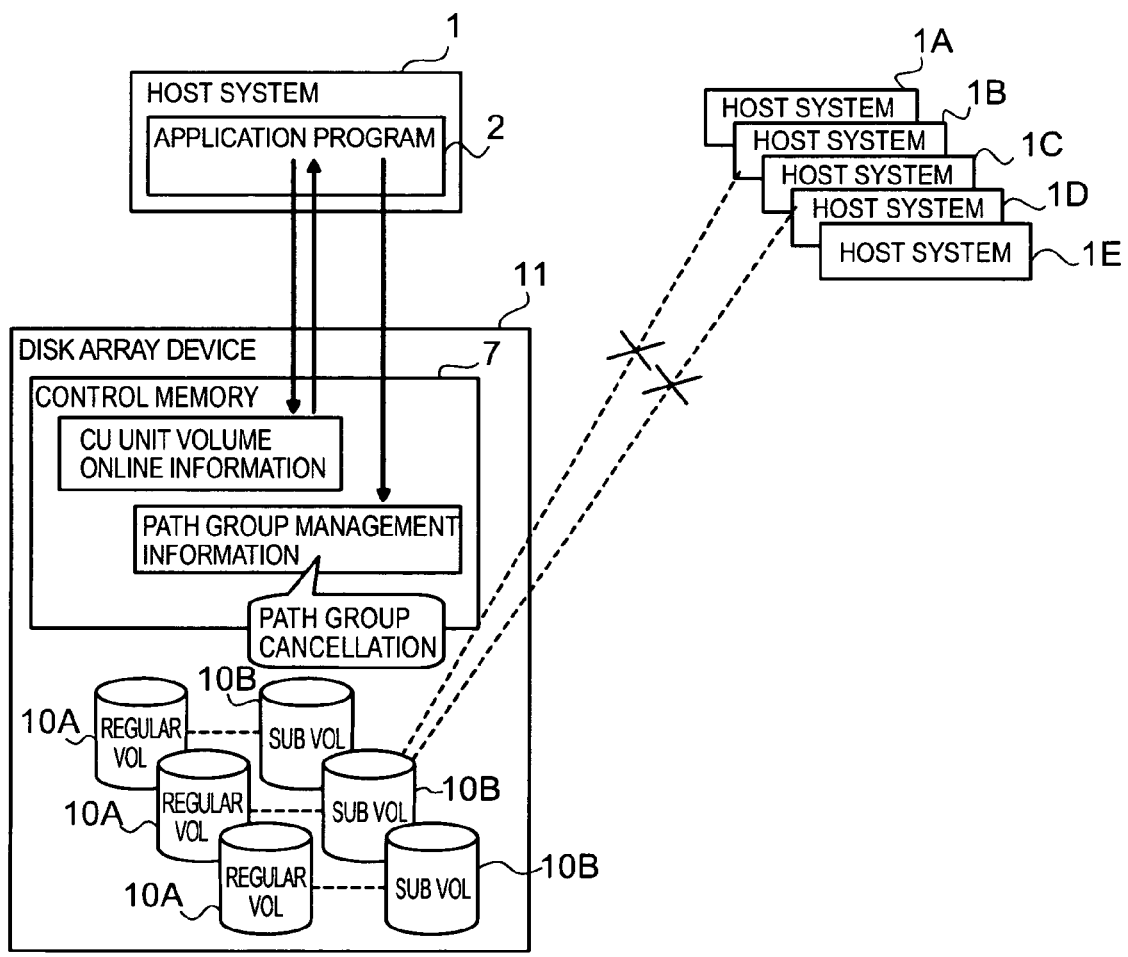
FIG. 5 shows an outline of a second processing flow executed when the AP2 issues a copy command.

Next, an outline of the second processing flow that is executed when the AP2 issues the above-mentioned copy command of the storage system pertaining to this embodiment will be provided with reference to FIG. 5. In the following description, parts that are different from those of the first processing flow are described; and the description of those parts that are the same will be omitted or simplified (this is also true of the third and fourth processing flows below).

The host AP2 performs the following processing before issuing a copy instruction for the logical volume 10 to the disk array device 11, for example.

The host AP2 receives the online information control table 14 from the disk array device 11 by means of the same method as the first processing flow and makes an ON/OFF judgment of whether the copy destination LUN inputted by the user is in the online state.

When the result of this ON/OFF judgment is that an online copy destination volume (subvolume) has been specified, the host AP2 generates a setting cancellation command 13 that includes target information with the LUN of the specified subvolume and relaying the fact that there is a single subvolume, and a clear instruction, that is, a setting cancellation command for canceling the path group information of the subvolume 10B (stated differently, a setting cancellation command for compulsorily switching the subvolume 10B from the online state to the offline state) 13, and sends this command to the disk array device 11.

The disk array device 11 receives the setting cancellation command 13 from the host AP2, cancels the path group information settings by accessing the LU control table (table of the control memory 7) corresponding with the LUN in the command 13, and changes the ON/OFF information from a '0' representing the online state to a '1' representing an offline state. Thereafter, the channel control unit 4 sends a completion report regarding the cancellation of the path group information to the host 1.

According to this processing flow, before the copy source volume and copy destination volume desired by the user are paired and data copying is executed, an ON/OFF judgment of whether the subvolume designated by the user is in the online state is performed. If the result of this ON/OFF judgment is that even one subvolume among the subvolumes designated by the user is an online subvolume, copying is not executed and the online subvolume can be compulsorily converted to an offline state. Stated using the illustrated example, the connection between one subvolume 10B and the separate hosts 1B and 1D is compulsorily broken. Thereafter, the channel control unit 4 sends the cancellation completion report to the host 1, and, once the copy command (or recopy command) is received from the host AP2 by way of response, data may be immediately copied from the copy source CU to the copy destination CU. In this case, the content of the copied data may be the content when the copying is executed or may be content that is obtained by means of a snapshot at the time the first examination command is received from the user.

Further, in the above processing flow, when it is detected that even one online LUN is present among the copy destination LUNs inputted by the user, the host AP2 may issue a setting cancellation command 13 for compulsorily converting the online subvolume to an offline state automatically with or without consulting the user. Further, after detecting an online subvolume, the host 1 or disk array device 11 may inquire whether the connection with all (or a preset portion of) the separate hosts connected to the online subvolume may be compulsorily broken at a predetermined time (such as immediately following detection or when the setting cancellation command 13 is received, for example). In this case, when an affirmative reply is obtained from all the separate hosts, the host 1 or disk array device 11 compulsorily converts the subvolume to the offline state, and when an affirmative reply is not obtained, discrimination information for a separate host for which an affirmative reply has not been obtained may be displayed on the display screen of the host 1 (at this stage, the description is the same as that of the fourth processing flow described subsequently).

However, the disk array device 11 may possess a function for preventing path cancellation by a connected host. For example, the user can also write information in a predetermined storage medium of the control memory or the like of the disk array device 11 beforehand so that even when a setting cancellation command 13 from another host (a path cancellation command, for example) is received, this cancellation is not executed. Accordingly, even when path cancellation information has been sent by mistake, it is possible to prevent path cancellation (that is, the forced conversion of an online state into an offline state) for a volume for which the online state with the host is always retained.

Figure 13:
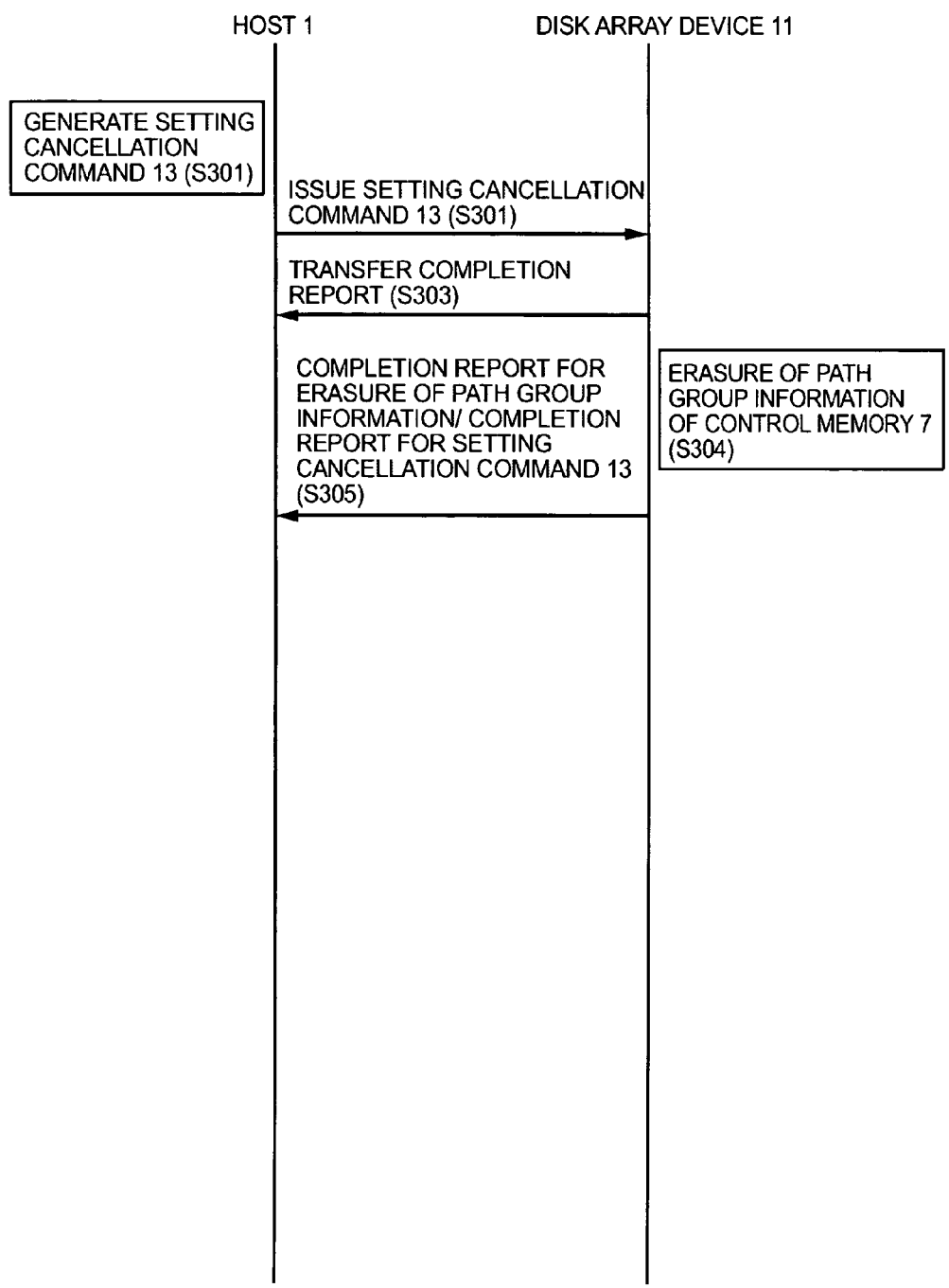
FIG. 13 shows a sequence of commands between the host 1 and disk array device 11 for the processing flow illustrated in FIG. 5.

FIG. 13 shows a sequence of commands between the host 1 and disk array device 11 for the processing flow illustrated in FIG. 5. The content of the command sequence in FIG. 13 will be described below for the respective processing of S301 to S305.

S301:

In order to erase the path group information of the control memory 7, the host 1 generates a setting cancellation command 13. In the setting cancellation subcommand 13 of this case, 'within unit' is designated as the control flag, and 'single volume' is designated as the target information.

S302:

The host 1 issues the second subcommand 13 thus generated to the disk array device 11.

S303:

The disk array device 11 reports the fact that the transfer of the second subcommand 13 is complete to the host 1.

S304:

The disk array device 11 erases the path group information recorded in the LU control table of the logical volume 10 designated by the setting cancellation command 13.

S305:

The disk array device 11 then issues a normal completion report for the path group information cancellation and a completion report for the setting cancellation command 13 to the disk array device 11.

The path group information is erased by this command sequence.

Figure 6:
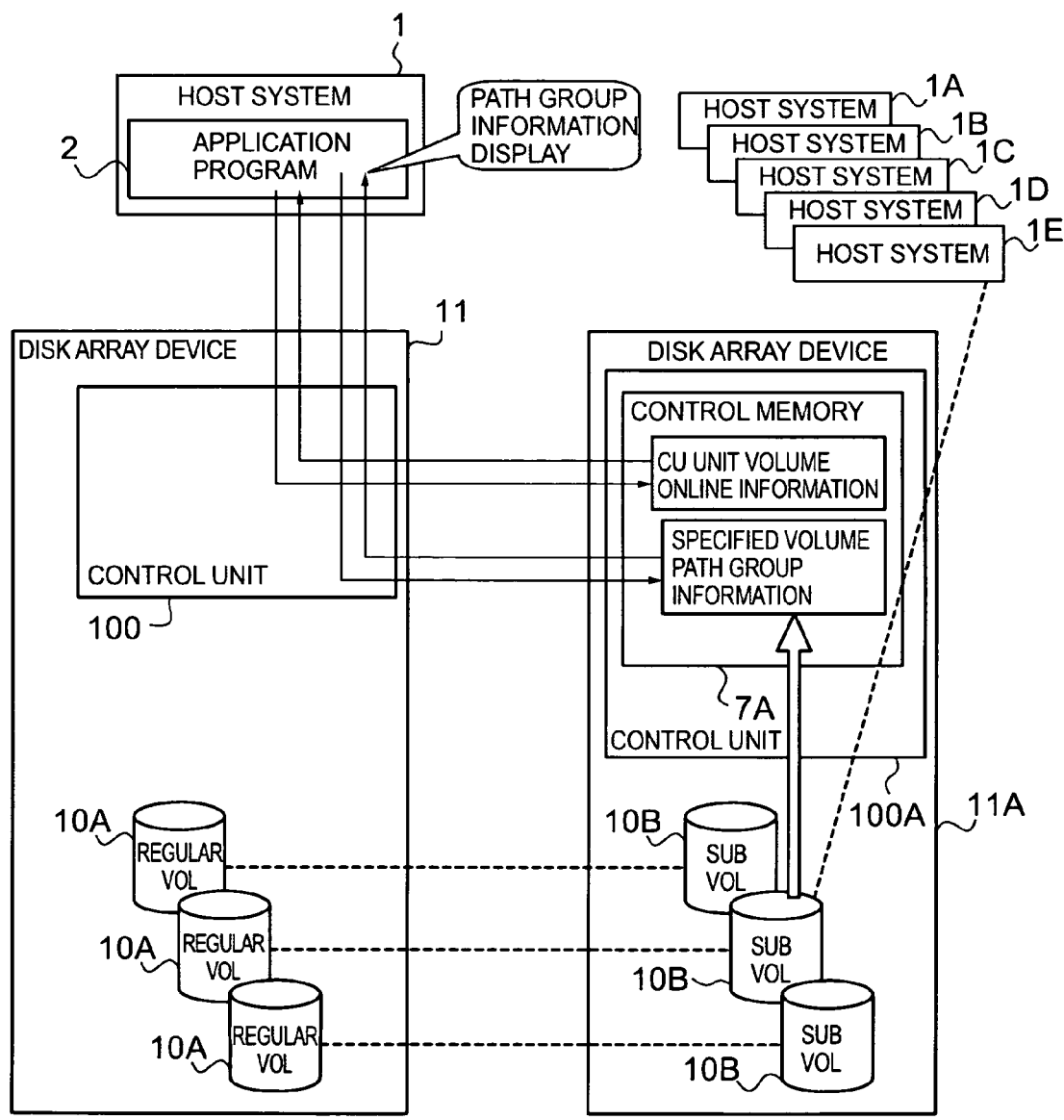
FIG. 6 shows an outline of a third processing flow executed when the AP2 issues a copy command.

Next, an outline of the third processing flow that is executed when the above-mentioned copy command is issued by the AP2 of the storage system pertaining to this embodiment will be provided with reference to FIG. 6.

In the third processing flow (and the fourth processing flow described subsequently), one or more (one, for example) separate device 11A is connected to the connection-destination disk array device 11 of the host 1. A plurality of regular volumes 10A in one copy source CU is present in the connection-destination disk array device 11 and a plurality of subvolumes 10B in the one copy destination CU is present in the separate disk array device 11A. The control unit 100 of the connection-destination disk array device 11 and the control unit 100A of the separate disk array device 11A comprise elements other than the physical disk groups 9 shown in FIG. 1, for example.

Once copying is designated by the user by inputting the required parameters (the copy destination CU number and LUN, for example), the host AP2 performs the following processing before a copy command (or recopy command) containing the inputted required parameters is generated and issued to the disk array device 11.

The host AP2 generates a first examination command 12 that has target information with the CU number of the copy destination CU (subvolume group) that was input by the user and relaying the fact that there is a plurality of subvolumes, as well as information indicating a 'separate unit' as the control flag, and sends this first examination command 12 to the connection-destination disk array device 11 of the host 1. In this case, when it is discriminated from the received examination command 12 that the control flag is 'separate unit', the channel control unit 4 that receives the examination command 12 transfers the examination command 12 to the separate channel control unit (not shown) of the separate disk array device 11A (here, the channel control unit 4 may take measures for changing the control flag from 'separate unit' to 'within unit', to prevent an output from a separate channel control unit).

When the separate channel control unit of the disk array device 11A receives an examination command 12 from the channel control unit 4 and it is identified that a CU number is contained in the target information, this separate channel control unit accesses control memory 7A, specifies a plurality of LUN corresponding with this CU number, and references a plurality of LU control tables corresponding with the plurality of LUN thus specified. Then, the separate channel control unit extracts a plurality of ON/OFF information items (0 or 1 one-bit information) from the plurality of LU control tables thus referenced, and, based on the extracted plurality of ON/OFF information items and the CU number and plurality of LUNs, generates an online information control table 14 that corresponds with the target CU (that is, a copy destination subvolume group). The separate channel control unit then sends the online information control table 14 thus generated to the disk array device 11. The disk array device 11 transfers the online information control table 14 to the host 1.

The second examination command 12 (that is, in which the control flag is 'separate unit') is sent from the host AP2 to the separate disk array device 11A via the disk array device 11, and, by way of response to this second examination command 12, the path group information control table 15 is generated and then sent via the disk array device 11 to the host 1 before being displayed thereby. However, the second examination command 12 need not necessarily pass via the disk array device 11. Instead, the online information control table 14 can be reported to the host system 1. For example, the information in the online information control table 14 may be sent between host systems.

According to this processing flow, stating this by means of the illustrated example, as a result of the processing in response to the first examination command 12, it is clear that one subvolume 10B in the separate disk array device 11A is in the online state, and, as a result of the processing in response to the second examination command 12, it is clear that the separate host 1E is connected to the subvolume 10B.

Figure 14:
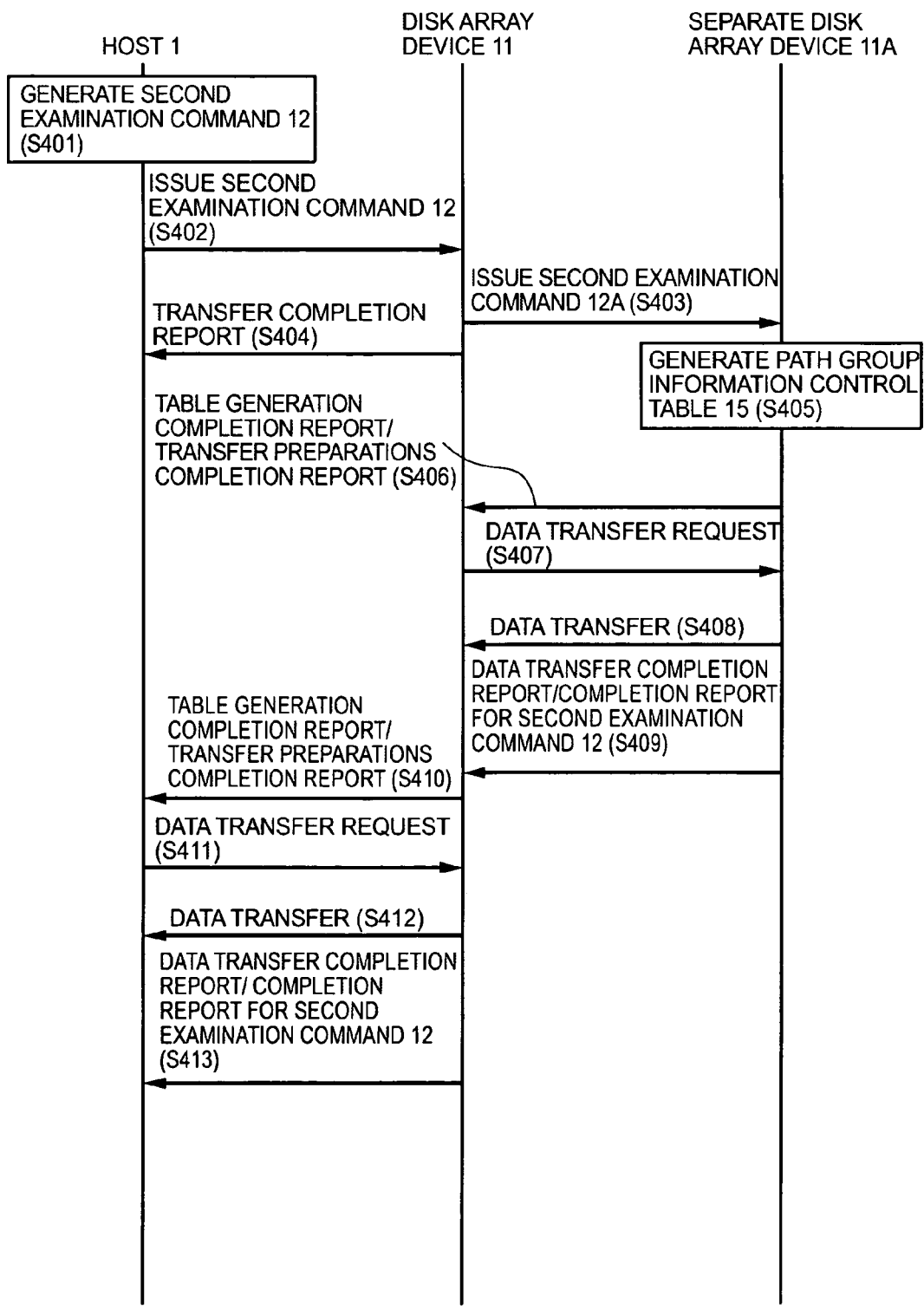
FIG. 14 shows a sequence of commands between the host 1, disk array device 11, and a separate disk array device 11A for the processing flow illustrated in FIG. 6.

FIG. 14 shows a sequence of commands between the host 1, disk array device 11, and a separate disk array device 11A for the processing flow illustrated in FIG. 6. The content of the command sequence in FIG. 14 will be described below for the respective processing of S401 to S413.

S401:
The host 1 generates a second examination command 12 in order to obtain path group information on the logical volumes 10 contained in the CU (information including the names of the hosts connecting to the subvolume). In the second examination command 12 of this case, 'separate unit' is designated as the control flag and 'single volume' is designated as the target information (as it is generated here, in the case of the first examination command 12 for obtaining online information for the logical volume 10 in the target CU, 'separate unit' is designated as the control flag, and 'plurality of volumes' is designated as the target information in command 12.

S402:
The host 1 issues the generated second examination command 12 (or first examination command 12) to the disk array device 11.

S403:
The disk array device 11 that receives the second examination command 12 from the host 1 reforms the second examination command (or first examination command) 12 as the second examination command (or first examination command) 12A in order to make it possible to issue the second examination command (or first examination command) 12 to the separate disk array device 11A (or another disk array device). In this case, if the second examination command (or first examination command) 12 itself is in the form of a command that can be issued to the separate disk array device 11A (or another disk array device), the command need not be reformed. The disk array device 11 issues the second examination command (or first examination command) 12A to the disk array device 11A.

S404:
The disk array device 11 reports the completion of the transfer of the second examination command (or first examination command) 12 to the host 1.

S405:
The separate disk array device 11A that receives the second examination command (or first examination command) 12A then generates a path group information control table 15 (or online information control table 14).

S406:
After generating the path group information control table 15 (or online information control table 14), the separate disk array device 1A issues a normal completion report to the effect that the path group information control table 15 (or online information control table 14) has been generated and a data-transfer preparations completion report to the disk array device 11.

S407:
The disk array device 11 issues a request to transfer the data of the path group information control table 15 (or online information control table 14) to the separate disk array device 11A.

S408:
The separate disk array device 11A then issues the data of the generated path group information control table 15 (or online information control table 14) to the disk array device 11.

S409:
The separate disk array device 11A issues a normal completion report for the data transfer of the path group information control table 15 (or online information control table 14) and a completion report for the second examination command (or first examination command) 12A to the disk array device 11.

S410:
The disk array device 11 issues a completion report regarding the completion of the generation of the path group information control table 15 (or online information control table 14) and a data-transfer preparations completion report to the host 1.

S411:
The host 1 issues a request to transfer the data of the path group information control table 15 (or online information control table 14) to the disk array device 11.

S412:
The disk array device 11 then transfers the data of the path group information control table 15 (or online information control table 14) received from the disk array device 11A to the host 1.

S413:
The disk array device 11 issues a normal completion report for the data transfer of the path group information control table 15 (or online information control table 14) and a completion report for the second examination command (or first examination command) 12 to the host 1.

As a result of this command sequence, the host 1 issues a command to the disk array device 11A via the disk array device 11 and receives the data requested.

Figure 7:
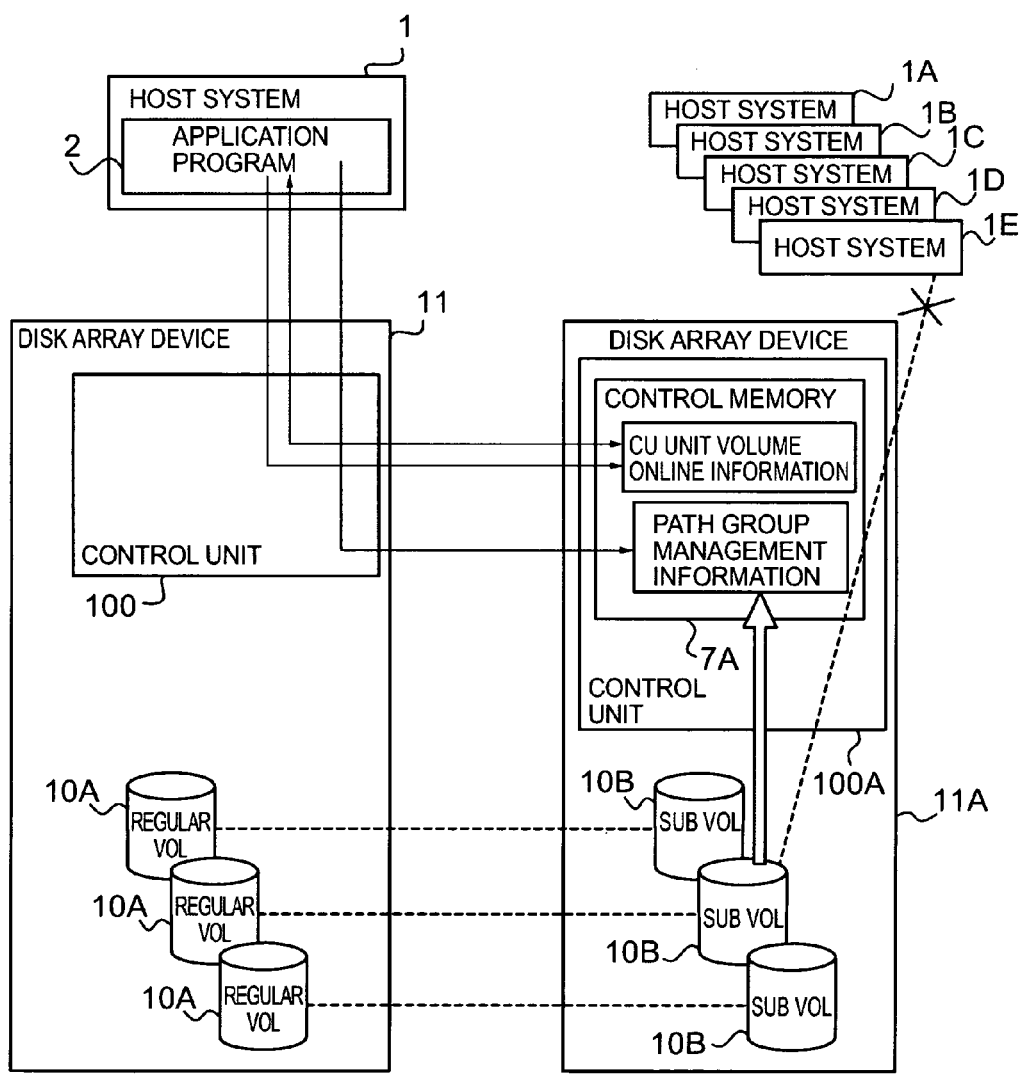
FIG. 7 shows an outline of a fourth processing flow executed when the AP2 issues a copy command.

Next, an outline of the fourth processing flow that is executed when the AP2 issues the above-mentioned copy command of the storage system according to this embodiment will be provided with reference to FIG. 7. In the following description, parts that are different from those of the third processing flow are described, while the description of those parts that are the same will be omitted or simplified.

In the fourth processing flow, similarly to the third processing flow, the host AP2 receives the online information control table 14 from the separate disk array device 11A via the connection-destination disk array device 11, and performs an ON/OFF judgment of whether the copy destination LUN inputted by the user is in the online state.

When the result of the ON/OFF judgment is that an online copy destination volume (subvolume) has been specified, the host AP2 generates a setting cancellation command 13 that includes a control flag indicating 'separate unit', target information with the LUN of the specified subvolume and relaying the fact that there is a single volume, and a clear instruction, and then sends this setting cancellation command 13 to the disk array device 11.

The separate channel control unit of the separate disk array device 11A that receives the setting cancellation command 13 from the disk array device 11 accesses the LU control table (table in the control memory 7A) corresponding with the LUN in the command 13 to cancel the path group information settings, and then changes the ON/OFF information from a '0' expressing the online state to a '1' expressing the offline state. Thereafter, the separate channel control unit sends a completion report that the path group information has been cancelled to the host 1 via the disk array device 11. However, the disk array device 11A may have a function preventing path cancellation by a host that is not directly connected. For example, the user or similar is also able to write information in the control memory or the like of the disk array device 11A beforehand so that, even when a path cancellation command is received from another host, this path cancellation is not executed. Accordingly, even when path cancellation information has been sent from another host system in error, path cancellation can be prevented for those volumes whose online state with the host is to be continually preserved.

FIG. 15 shows a sequence of commands between the host 1, disk array device 11, and a separate disk array device 11A for the processing flow illustrated in FIG. 7. The content of the command sequence in FIG. 15 will be described below for the respective processing of S501 to S507.

S501:
The host 1 generates a setting cancellation command 13 in order to erase path group information of the control memory 7. In the setting cancellation command 13 of this case, 'separate unit' is designated as the control flag and 'single volume' is designated as the target information.

S502:
The host 1 issues the setting cancellation command 13 thus generated to the disk array device 11.

S503:
The disk array device 11 that receives the setting cancellation command 13 from the host 1 reforms the setting cancellation command 13 as the setting cancellation command 13A in order to make it possible to issue the setting cancellation command 13 to the disk array device 11A or another disk array device. In this case, if the setting cancellation command 13 itself is in the form of a command that can be issued to the disk array device 11A or another disk array device, there is no need to reform the command. The disk array device 11 issues the setting cancellation command 13A to the disk array device 11A.

S504:
The disk array device 11 reports the completion of the transfer of the setting cancellation command 13 to the host 1.

S505:
The disk array device 11A that receives the setting cancellation command 13A erases path group information of the target in the control memory 7 in the disk array device 11A (that is, path group information in an LU management table corresponding with the logical volume that is designated in this command 13A).

S506:
After erasing path group information of the control memory 7, the disk array device 11A issues a normal completion report for the path group information erasure and a completion report for the setting cancellation command 13A to the disk array device 11.

S507:
The disk array device 11 issues a normal completion report for the path group information erasure and a completion report for the setting cancellation command 13 to the disk array device 11.

S508:
As a result of this command sequence, the host 1 issues a setting cancellation command to the disk array device 11A via the disk array device 11 to erase path group information for the logical volume requested.

The processing flow that is executed by the above storage system will be described below with reference to the flowcharts of FIGS. 8 to 10.

Figure 8:
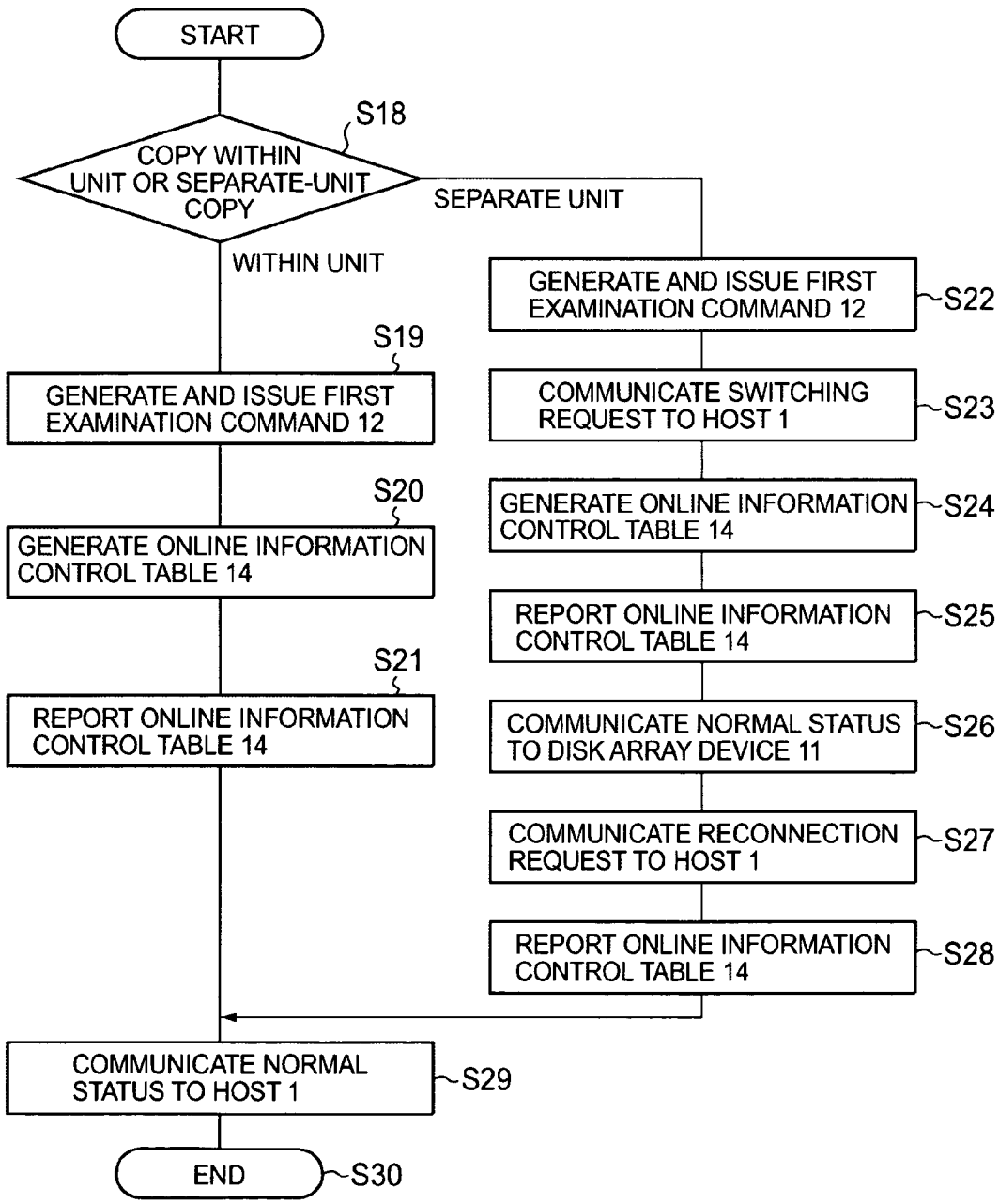
FIG. 8 shows an example of a priority table 13 to which tape recording media discrimination information has been added.

FIG. 8 is a flowchart of the processing that is executed when the first examination command for receiving the provision of the online information control table 14 is issued.

When an input of the required parameters that are designated for copying is received and copying is designated, the host AP2 judges (step S18) whether the copy destination CU exists within the unit (within the connection-destination disk array device 11) or in a separate unit (outside the connection-destination disk array device 11) on the basis of the required parameters and the LU management table (a table that contains information on which disk array device each CU is in, for example) (or stated differently, the host AP2 judges the copying type).

When the result of S18 is that the copying type is copying within the unit, the host AP2 specifies the copy destination CU number from the parameters inputted in order to perform the copying, generates a first examination command 12 that includes target information with the copy destination CU number and a control flag signifying 'within unit', and issues the first examination command to the disk array device 11 (S19).

The channel control unit 4 of the disk array device 11 reports that the first examination command 12 has been received to the host 1, generates the online information control table 14 by means of the above method on the basis of the information in the first examination command 12, and then sends a generation completion report to the host 1 (S20). In the online information control table 14, for example, the 'number of online volumes' denotes the number of logical volumes that are online among 256 logical volumes 10 contained in the target CU and is therefore expressed by a value from X' 0000'to X' 0100'. Further, for example, 'examination target information' denotes information that is the SSID and CU number that the target logical volume 10 comprises and the product number of the disk array device 11. Further, for example, the 'ON/OFF list' has 256 one-bit information items ('0' indicating an online state or '1' indicating an offline state) corresponding with 256 logical volumes 10 included in the target CU.

The channel control unit 4 receives an instruction to acquire the online information control table 14 from the host 1 in response to the generated completion report, and, in response to this acquisition instruction, reports the generated online information control table 14 to the host 1 (S21). Thereafter, the channel control unit 4 communicates the normal status to the host 1 (S29) and the processing ends (S30).

Furthermore, when the result of S18 is that the copying type is copying to a separate unit (copying takes place between the connection-destination disk array device 11 and the separate disk array device 11A), the host AP2 generates the first examination command 12 that includes a control flag denoting a 'separate unit' and issues the first examination command 12 to the disk array device 11 (S22).

Next, the channel control unit 4 of the disk array device 11 that receives the first examination command 12 issues the first examination command 12 thus received to the separate disk array device 11A. The channel control unit 4 communicates the fact that the transfer of the first examination command 12 to the separate disk array device 11A is complete to the host 1 and hence the channel control unit 4 makes a switching request to the host 1 (more specifically, for example, a request to disconnect a predetermined communication among a plurality of communications) (S23) Accordingly, the host 1 switches the connection between the host 1 and the disk array device 11.

Next, the separate channel control unit of the separate disk array device 11A that receives the first examination command 12 generates the online information control table 14 based on information in this command 12 and sends a generation completion report to the disk array device 11 (S24).

In response to this generation completion report, the disk array device 11 issues an instruction to acquire the online information control table 14 to the separate disk array device 11A. In response to this acquisition instruction, the separate disk array device 11A then reports the generated online information control table 14 to the connection-destination disk array device (S25). The separate disk array device 11A then communicates the normal status to the connection-destination disk array device 11 (S26).

By way of response to the communication regarding the normal status, the connection-destination disk array device 11 reports the completion of the command processing to the host 1. The connection-destination disk array device 11 takes advantage of the fact that the completion of the command processing has been reported to the host 1 to communicate a request for reconnection to the host 1 (S27).

In response to this reconnection request, the host 1 issues an instruction to acquire the online information control table 14 to the connection-destination disk array device 11. In response to the acquisition instruction, the connection-destination disk array device 11 communicates the online information control table 14 that has been transferred by the separate disk array device 11A to the host 1 (S28). Thereafter, the connection-destination disk array device 11 communicates the normal status to the host 1 (S29) and the processing ends (S30).

Figure 9:
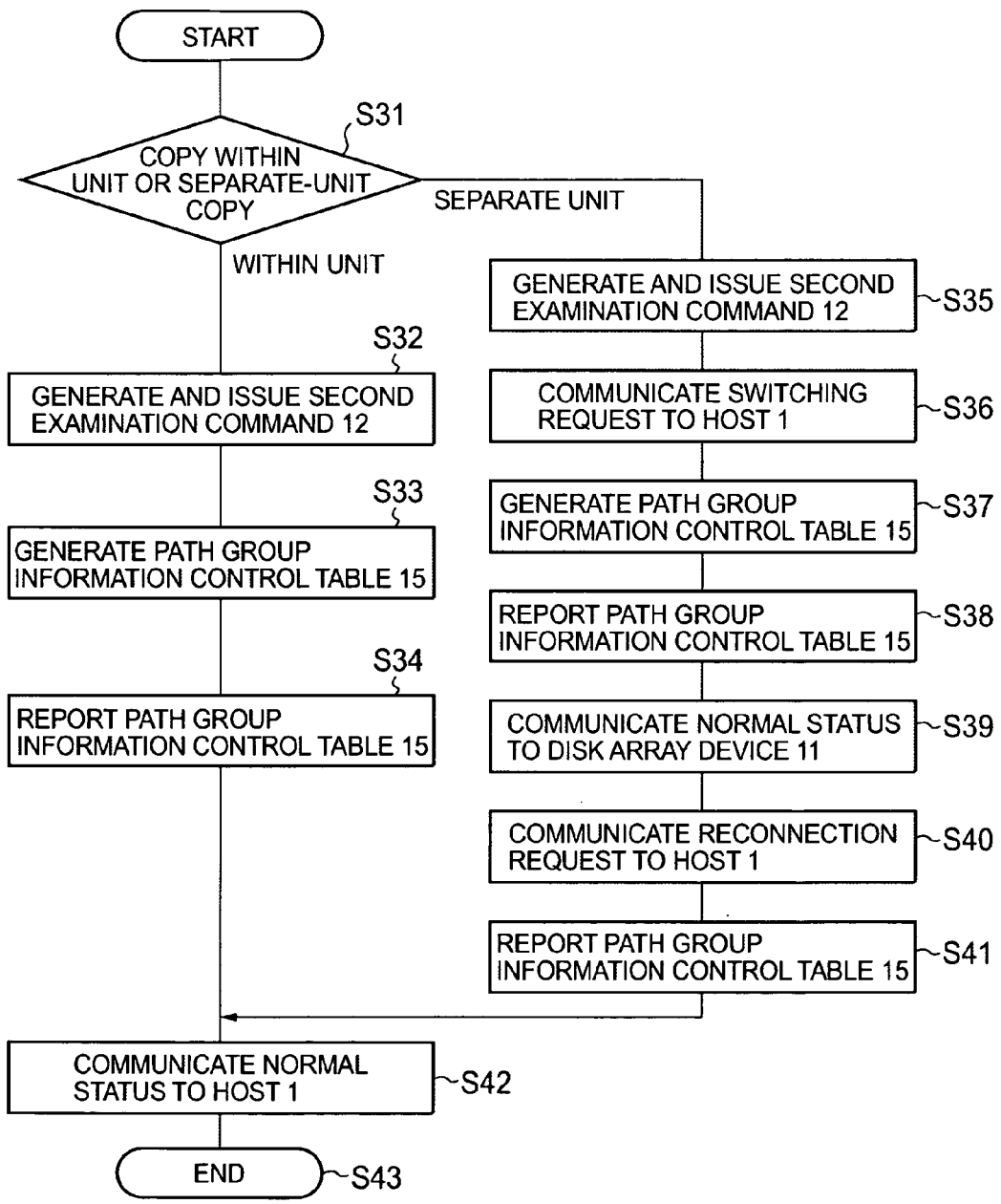
FIG. 9 is a flowchart for the processing that is executed when a second examination command for receiving the provision of a path group information control table 15 is issued.

FIG. 9 is a flowchart for the processing that is executed when a second examination command for receiving the provision of a path group information control table 15 is issued.

The host AP2 executes the following processing when, for example, as a result of a comparison of the reported online information control table 14 and the inputted required parameters, it is identified that there is even one online subvolume among a plurality of subvolume LUNs inputted by the user.

The host AP2 judges (S31) whether the copy destination CU exists within the unit (within the connection-destination disk array device 11) or in a separate unit (outside the connection-destination disk array device 11) based on the required parameters inputted by the user and the LU management table (a table that contains information on which disk array device each CU is in, for example) (or stated differently, the host AP2 judges the copying type).

When the result of S31 is that the copying type is copying within the unit, the host AP2 generates a second examination command 12 that includes target information with the LUN of an online and specified subvolume (LUN inputted by the user), and a control flag signifying 'within unit', and then issues this second examination command 12 to the disk array device 11 (S32).

The channel control unit 4 of the disk array device 11 reports the receipt of the second examination command 12 to the host 1, generates the path group information control table 15 by means of the above method on the basis of the LU control table corresponding with the LUN in the second examination command 12, and then sends a generation completion report to the host 1 (S33). In the path group information control table 15, for example, where 'the number of online paths' is concerned, the number of paths established for the logical volume 10 constituting the target is indicated by a value in base 16 from X' 000' to X' 100'. Further, for example, 'examination target information' includes information that is the address of the target logical volume 10, the SSID and CU number that the logical volume 10 comprises, and the product number of the disk array device 11 (in the 'separate unit' case, the separate disk array device 11A). In addition, for example, 'path group information' denotes the number of a logical path set in the target volume, and path group attribute information. The logical path number is the number of an online logical paths. More specifically, for example, whether the logical path is online or not is expressed by the binary digits 1 and 0 (0: online, an 1: offline), and these bits are expressed in the format of a bitmap for the number of logical paths that can exist in the disk array device 11. The path group attribute information expresses, for example, the validity or invalidity of a path group and a multipath group or a single-path group by means of a binary bitmap.

The channel control unit 4 receives an instruction to acquire the path group information control table 15 from the host 1 in response to the above-mentioned generation completion report, and, in response to this acquisition instruction, reports the generated path group information control table 15 to the host 1 (S34). Thereafter, the channel control unit 4 communicates the normal status to the host 1 (S42) and the processing ends (S43).

Further, when the result of S31 above is that the copying type is copying to a separate unit, the host AP2 generates a second examination command 12 that includes a control flag signifying 'separate unit' and issues this second examination command 12 to the disk array device 11 (S35).

Next, the channel control unit 4 of the disk array device 11 that receives the second examination command 12 issues the received second examination command 12 to the separate disk array device 11A. The channel control unit 4 communicates the fact that the second examination command 12 has been transferred to the separate disk array device 11A to the host 1 and hence the channel control unit 4 issues a switching request to the host 1 (more specifically, for example, a request to disconnect a predetermined communication among a plurality of communications (S36). Accordingly, the host 1 switches the connection between the host 1 and the disk array device 11.

Next, the separate channel control unit of the separate disk array device 11A that receives the second examination command 12 generates the path group information control table 15 on the basis of information in this command 12 and sends a generation completion report to the disk array device 11 (S37).

In response to the generation completion report, the disk array device 11 issues an instruction to acquire the path group information control table 15 to the separate disk array device 11A, and, in response to this acquisition instruction, the separate disk array device 11A reports the generated path group information control table 15 to the connection-destination disk array device 11 (S38). Further, the separate disk array device 11A communicates the normal status to the connection-destination disk array device 11 (S39).

In response to the communication regarding the normal status, the connection-destination disk array device 11 reports the completion of the command processing to the host 1. The connection-destination disk array device 11 takes advantage of the fact that the completion of the command processing has been reported to the host 1 to communicate a request for reconnection to the host 1 (S40).

In response to this reconnection request, the host 1 issues an instruction to acquire the path group information control table 15 to the connection-destination disk array device 11. By way of response to this acquisition instruction, the connection-destination disk array device 11 reports the path group information control table 15 that has been transferred by the separate disk array device 11A to the host 1 (S41). Thereafter, the connection-destination disk array device 11 communicates the normal status to the host 1 (S42) and the processing ends (S43).

Figure 10:
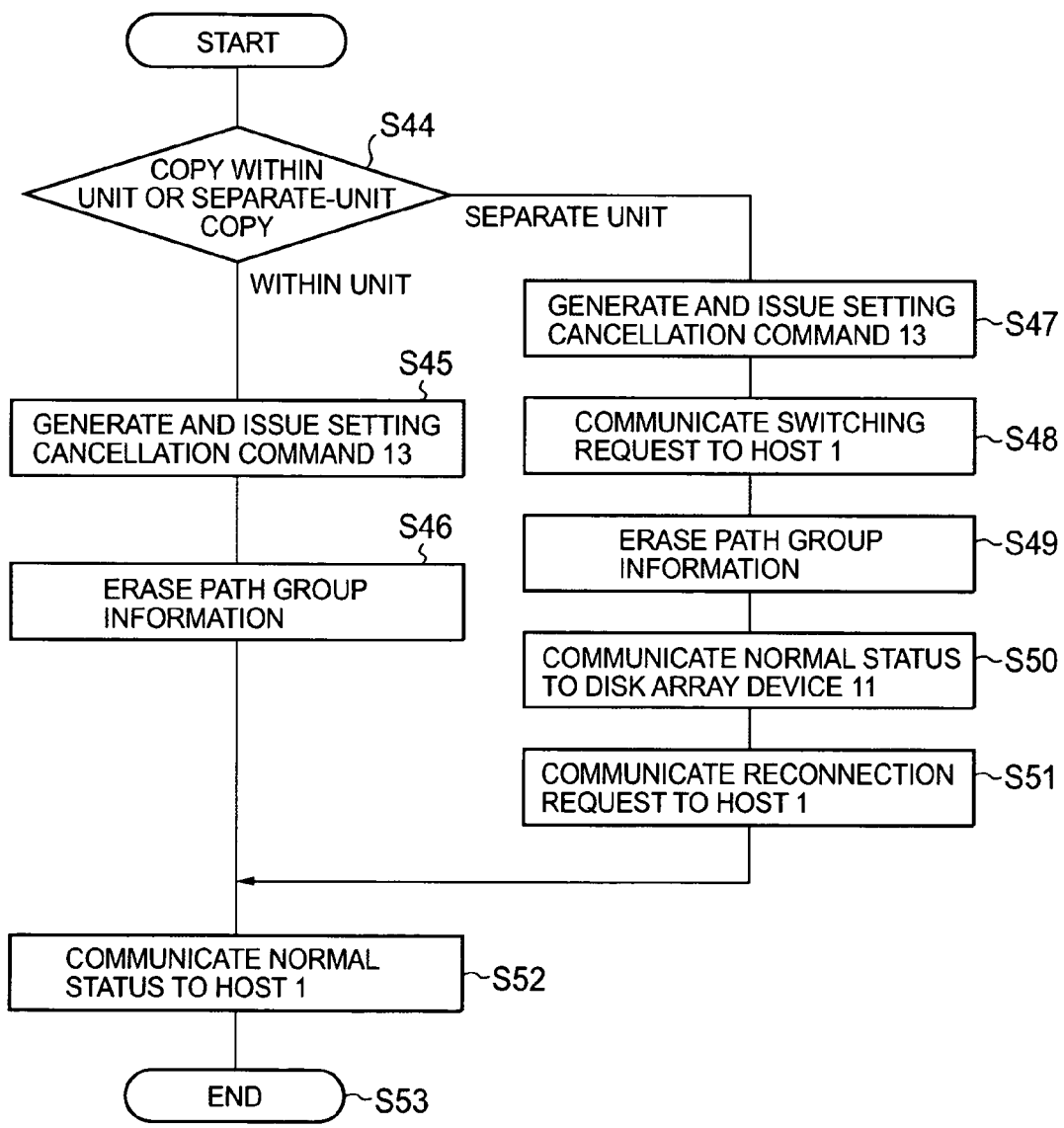
FIG. 10 is a flowchart for the processing that is executed when a setting cancellation command 13 for changing the subvolume from an online state to an offline state is issued.
Figure 11:
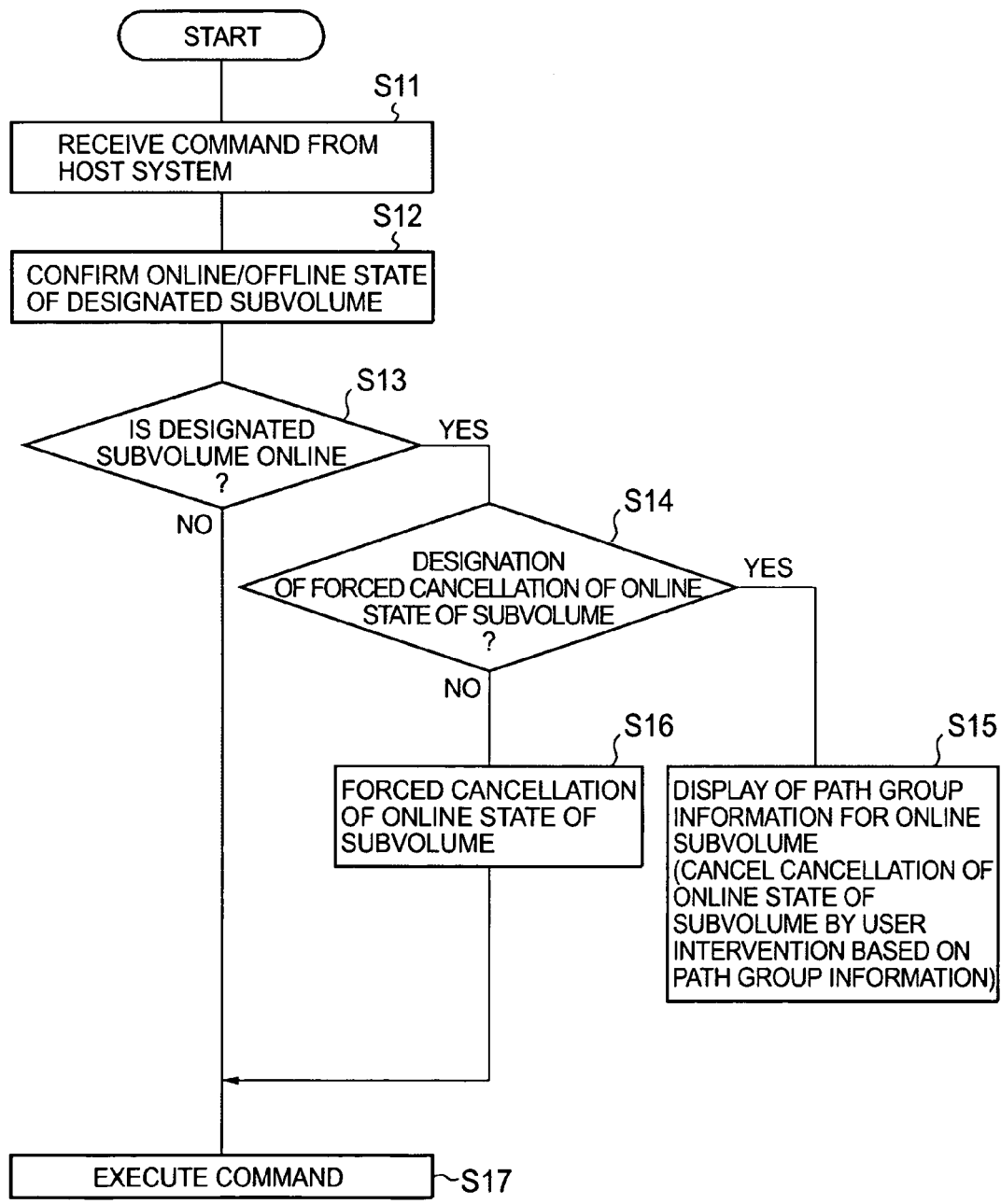
FIG. 11 shows the operational flow of a disk array device 11 of a fourth embodiment example of one embodiment of the present invention.

FIG. 10 is a flowchart for the processing that is executed when a setting cancellation command 13 for changing the subvolume from an online state to an offline state is issued.

The host AP2 judges (step S44) whether the copy destination CU exists within the unit (within the connection-destination disk array device 11) or in a separate unit (outside the connection-destination disk array device 11) on the basis of the required parameters inputted by the user and the LU management table (a table that contains information on which disk array device each CU is in, for example) (stated differently, the host AP2 judges the copying type).

When the result of S44 is that the copying type is within the unit, the host AP2 generates a setting cancellation command (a command in which the control flag is 'within unit') 13 that includes the LUN of the online subvolume among the required parameters inputted by the user, and sends this setting cancellation command 13 to the disk array device 11 (S45).

The channel control unit 4 of the disk array device 11 accesses the LU control table corresponding with the LUN included in the received setting cancellation command 13 to cancel path group information recorded in the LU control table, and changes the ON/OFF information from an online state '0' to an offline state '1' (S46). Thereafter, the channel control unit 4 communicates the normal status to the host 1 (S52) and the processing ends (S53).

Meanwhile, when the result of S44 is that the copying type is copying between separate units, the host AP2 generates a setting cancellation command (a command in which the control flag is 'separate unit') 13 that includes the LUN of the online subvolume among the required parameters inputted by the user, and sends this setting cancellation command 13 to the disk array device 11 (S47).

The disk array device 11 transfers the setting cancellation command 13 received from the host 1 to the separate disk array device 11A. Thereafter, the disk array device 11 communicates the fact that the transfer to the separate disk array device 11A has been completed to the host 1, and hence the disk array device 11 issues a switching request to the host 1 (more specifically, for example, a request to disconnect a predetermined communication among a plurality of communications (S48). Accordingly, the host 1 switches the connection between the host 1 and the disk array device 11.

In response to the setting cancellation command 13 that has been transferred, the separate disk array device 11A references the LU control table corresponding with the LUN in the setting cancellation command 13 to cancel the path group information from the LU control table (S49) Thereafter, the separate disk array device 11A communicates the normal status to the disk array device 11 (S50).

The disk array device 11 that has received notice of the normal status reports the completion of the command processing to the host 1. Thereafter, the disk array device 11 takes advantage of the fact that the completion of the command processing has been reported to the host 1 to communicate a reconnection request to the host 1 (S51). Then the disk array device 11 communicates the normal status to the host 1 (S52) and the processing accordingly ends (S53).

According to the embodiment above, the path group information regarding which host each volume is connected to is registered in the control memory 7 for each of the logical volumes 10. Before a copy command is issued by the host 1 and data copying is performed, it is judged whether the target subvolume is in an online state, and if same is indeed in the online state, path group information corresponding with the target subvolume is sent to and displayed by the host 1. Accordingly, the user of the host 1 is able to specify easily to which separate host the target subvolume is connected and hence the load for converting the subvolume to the offline state is reduced.

Further, according to the above embodiment, before data copying is performed, the first and second examinations are performed, and, when the target subvolume is switched from the online state to the offline state after the second examination, data copying is executed. Accordingly, data is backed up normally to the database formed by the plurality of subvolumes.

Further, according to the above embodiment, if the host AP2 sends the setting cancellation command 13 to the disk array device 11, the target subvolume is switched from the online state to the offline state. Therefore, a subvolume that is in an online state can be converted easily to the offline state.

Further, several modified examples as detailed below may be considered in the above embodiment.

For example, in a first modified example, the channel control unit 4, which generates the online information control table 14, may record not only '1' or '0' one-bit information in the ON/OFF list, but also the number (LUN) of each logical volume corresponding with each one-bit information item.

In a second modified example, upon receiving a first examination command in addition to the input of the CU number of the target CU or the LUN of the target volume from the user, the host AP2 may generate a first examination command 12 and send same to the disk array device 11. Similarly, upon receiving a second examination command in addition to the input of the LUN of the target volume from the user, the host AP2 may generate a second examination command 12 and send same to the disk array device 11.

In a third modified example, ON/OFF information need not be present in the LU control table corresponding with the LU. In this case, an online state or offline state may be judged according to the presence or absence of path group information.

In a fourth modified example, the host AP2 may generate and send a copy command (or recopy command) to the disk array device 11 instead of issuing a first examination command or second examination command, or the like. In this case, the channel control unit 4 of the disk array device 11 executes a first examination at the time the copy command (or recopy command) is received (and executes a second examination if need be). As a result of the first examination (and of the second examination), as long as there is no obstacle to copying, copying is executed, and if such an obstacle exists, the examination result may be reported to the user. Further, in this fourth modified example, the channel control unit 4 converts all of the one or more target subvolumes in the online state to the offline state and may then execute copy processing according to the copy command (recopy command) received with predetermined timing (immediately, for example).

An example of the operational flow of the disk array device 11 of the fourth modified example will be described below with reference to FIG. 8.

The channel control unit 4 of the disk array device 11 receives the copy command (or the recopy command) from the host 1 (S11). Before executing this copy command (or recopy command), the channel control unit 4 references one or more LU control tables corresponding with the one or more copy destination LUN (that is, the LUN of one or more target subvolumes) included in this copy command, and then judges whether each of the one or more target subvolumes is in the online state (S12).

When, as a result of S12, the channel control unit 4 judges that all of the one or more target subvolumes are in the offline state (NO in S12), the channel control unit 4 starts processing to execute the copy processing in accordance with the received copy command (or recopy command) (S17). For example, when the disk array device 11 executes copy processing according to the copy command, all the data in the target regular volumes is copied to the target subvolumes. Further, for example, when the disk array device 11 executes copy processing in accordance with a recopy command, only the updated data in the target regular volumes is copied to the target subvolumes.

Meanwhile, when, as a result of the S12, the channel control unit 4 judges that even one of the one or more target subvolumes is in the online state (YES in S12), the channel control unit 4 judges whether online cancellation of the subvolume has been designated (S14). This judgment can be performed on the basis of whether online cancellation designation information corresponding with the LUN of the target subvolume is included in the copy command (or recopy command) from the host 1, or based on whether the LUN of the logical volume that may undergo the online forced cancellation is registered in a predetermined storage medium of the control memory 7 or the like, for example.

When, as a result of S14, online cancellation has been designated for the online target subvolume (YES in S14), the channel control unit 4 changes the subvolume from an online state to an offline state (S16). Thereafter, the channel control unit 4 executes the processing of S17 above.

On the other hand, when, as a result of S14, online cancellation has not been designated for the online target subvolume (NO in S14), the channel control unit 4 generates the path group information control table 15 by acquiring path group information for the online subvolume from the control memory, and reports this table 15 to the host 1 (S15). The host 1 displays path group information that is written in the table 15, and, upon receiving the designation of the LUN of the target subvolume and a setting cancellation command from the user, generates a setting cancellation command 13 that includes this LUN before sending this setting cancellation command 13 to the disk array device 11. The channel control unit 4 then changes the online subvolume to the offline state in response to the setting cancellation command 13.

Further, in this operational flow, the procedure of the respective processing of S11 to S17 may be collectively defined and executed. More specifically, as pre-processing for copying, the processing of S11 to S17 may be performed.

According to the fourth modified example, when an online forced cancellation is designated, the state of the subvolume is identified beforehand. If this subvolume is in the online state, copy processing is executed after this state has been cancelled. Therefore, even when the subvolume is in the online state, copying is performed after changing this state to the offline state.

Further, in a fifth modified embodiment, at least one of the first examination and the second examination above may be executed by a component other than the channel control unit 4 in the disk array device 11.

In the sixth modified example, even when a recopy command for copying is sent once the paired state of each regular volume in the copy source CU and each subvolume in the copy destination CU has been cancelled and the paired state then reformed, the host AP2 may send the first examination command, second examination command, or the like, to the disk array device 11. Further, as mentioned above, upon receiving a recopy command, the disk array device 11 may execute the first examination, second examination, or the like before executing copy processing in accordance with this command.

In a seventh modified embodiment, a first examination command 12 or second examination command 12 may be included in a copy command or recopy command. Further, a setting cancellation command 13 may be included in the copy command or recopy command. In this case, upon receiving the copy command or recopy command, the channel control unit 4 may execute the first examination command 12, second examination command 12 and/or setting cancellation command 13 contained in this command before executing the copy processing on the basis of this command.

Although embodiments and modified examples of the present invention have been described hereinabove, same are illustrations serving to explain the present invention and are not intended to limit the scope of the present invention to these embodiments and modified examples alone. The present invention can also be implemented in a variety of other forms.

For example, as a first aspect of the storage system according to the present invention, a plurality of volume groups containing two or more logical volumes exists in the plurality of logical volumes. In this case, volume-group discrimination information for each of the plurality of volume groups and two or more volume discrimination information items corresponding with two or more logical volumes contained in these volume groups are recorded in the control memory. The storage control subsystem performs a first examination of whether the two or more subvolumes are in an online state based on two or more ON/OFF information items corresponding with two or more subvolumes in a target subvolume group containing the target subvolume (that is, performs a first examination in volume-group units). When it is clear as a result of the first examination that the target subvolume among the two or more subvolumes is in an online state, the storage control subsystem performs the second examination with respect to the target subvolume and sends the result of the second examination to the certain host device.

For example, as a second aspect of the storage system according to the present invention, the certain host device of the first aspect generates a first examination command that includes volume-group discrimination information on the target subvolume group and sends this first examination command to the storage control subsystem. In response to the first examination command received from the certain host device, the storage control subsystem performs the first examination and sends the first examination result to the certain host device. The certain host device then generates a second examination command that includes volume-discrimination information on the target subvolume which is judged from the first examination result as being in an online state and then sends this second examination command to the storage control subsystem. By way of response to the second examination command received from the certain host device, the storage control subsystem performs a second examination and sends the second examination result to the certain host device. The certain host device then displays the second examination result.

For example, as a third aspect of the storage system according to the present invention, the ON/OFF information of the first aspect is one-bit information expressed by 1 or 0, and two or more one-bit information items corresponding with two or more subvolumes included in the target subvolume are included in the first examination result. The certain host device stores, for each of the plurality of volume groups, a volume-group discrimination number, and a volume management table in which two or more volume discrimination numbers corresponding with two or more logical volumes contained in the volume group are recorded in this number order. Upon receiving an input of a volume discrimination number for the one or more target subvolumes from the user, the certain host device generates the first examination command that includes the volume discrimination number of the target subvolume group containing the target subvolume and sends this first examination command to the storage control subsystem, and, upon receiving the first examination result in response to this first examination command, judges whether the one or more target subvolumes is online on the basis of the two or more one-bit information items included in the first examination result, the one or more volume discrimination numbers inputted by the user, and the volume management table; and, upon judging that at least one target subvolume is in the online state, the certain host device generates the second examination command for the target subvolume and then sends the second examination command to the storage control subsystem.

For example, as a fourth aspect of the storage system according to the present invention, when the certain host device issues a copy command after volume discrimination information for the target regular volume and volume discrimination information on the target subvolume have been input by the user and/or issues a recopy command for copying once the paired state of the target regular volume and target subvolume has been cancelled and the paired state then reformed: an examination command that includes volume discrimination information on the target subvolume is generated and sent to the storage control subsystem; and the first and second examinations are performed before the target regular volume and the target subvolume are paired and data in the target regular volume is copied to the target subvolume.

For example, as a fifth aspect of the storage system according to the present invention, the certain host device receives a copy instruction from the user and issues a copy command in response to this copy instruction after volume discrimination information for the target regular volume and volume discrimination information on the target subvolume have been inputted by the user and/or issues a recopy command for copying once the paired state of the target regular volume and target subvolume has been cancelled and the paired state then reformed. When the storage control subsystem receives the copy command or recopy command, before executing copy processing on the basis of this command, the storage control subsystem performs the first examination by referencing ON/OFF information corresponding with discrimination information on the target subvolume that is included in this command, executing copy processing on the basis of the copy command or recopy command upon judging that the target subvolume is in the offline state as a result of the first examination but, on the other hand, executing the second examination upon judging that the target subvolume is in the online state as a result of this first examination.

For example, as a sixth aspect of the storage system according to the present invention, instead of or in addition to performing the second examination, the storage control subsystem switches the target subvolume from the online state to the offline state (for example, breaks the connection between the target subvolume and the separate host device) when it is judged that the target subvolume is in the online state as a result of the first examination.

For example, as a seventh aspect of the storage system according to the present invention, the storage control subsystem in the sixth aspect switches the target subvolume from the online state to the offline state (changes the status indicated by the ON/OFF information of the target subvolume from online to offline, for example) in at least one of cases (1) to (3) below: (1) when a setting cancellation command that includes discrimination information on the target subvolume is received from the certain host device after the second examination result is sent to the certain host device; (2) when path group information corresponding with the target subvolume is referenced, an inquiry is made with regard to whether the connection thereof with all or part of one or more separate host devices specified based on this path group information may be cancelled, and a reply relaying that the connection may be cancelled is then obtained in response to this inquiry; and (3) when a predetermined time has elapsed after judging that the target subvolume is in an online state (immediately after this judgment, for example).

For example, as an eighth aspect of the storage system according to the present invention, when a separate storage control subsystem is connected to the storage control subsystem, the target regular volume exists in the storage control subsystem, and the target subvolume exists in the separate storage control subsystem: the separate storage control subsystem references the control memory in the system, performs the first and second examinations, and sends the results of the first and second examinations to the certain host device. Each examination result may be sent to the certain host device via the storage control subsystem or directly without passing via the storage control subsystem.

Furthermore, for example, the disk array device 11 of the above embodiment can be implemented abstractly as detailed below.

The storage control subsystem comprises a plurality of logical volumes prepared on one or more physical storage devices; volume information storage means for storing, for each of the plurality of logical volumes, volume discrimination information, ON/OFF information expressing whether or not each volume is in an online state, and path group information with regard to which host device a subvolume is connected to if in the online state; first examination means for performing, as a result of receiving a specific command from a certain host device, a first examination of whether a target subvolume is in an online state based on the ON/OFF information on the target subvolume before a target regular volume and the target subvolume among the plurality of volumes are paired and data in the target regular volume is copied to the target subvolume; second examination means for performing a second examination with regard to which separate host device the target subvolume is connected to based on path group information on the target subvolume when, as a result of the first examination, it is clear that the target subvolume is in the online state; and second examination result reporting means for sending the result of the second examination to the certain host device.

What is claimed is:

1. A storage control subsystem that can communicably connect to a host, comprising:
   a disk portion that stores data sent by the host;
   a channel control unit that constitutes an interface with the host;
   a disk control unit that is connected to the disk portion and constitutes an interface with the disk portion;
   a cache memory unit that temporarily stores data that is sent and received to and from the channel control unit and the disk control unit; and
   a control memory that stores information on the constitution of a plurality of logical volumes formed according to disk allocation,
   wherein the control memory comprises:
   online information indicating whether a logical volume in the disk portion is online, and
   information on a path between the online logical volume and the host to which the online logical volume is connected,
   wherein the storage control subsystem receives a referral request for the online information and the information of the path from the host via another storage control subsystem, and,
   wherein when information on path cancellation with respect to the online logical volume is received from the host via the another storage control subsystem, the path cancellation with respect to the online logical volume that is designated by the path cancellation is executed.

2. The storage control subsystem according to claim 1, wherein, when the path cancellation information is received from a host connected via the another storage control subsystem, the disk control unit functions so that the path cancellation is executed.

3. A storage control subsystem connected to one or more host devices, comprising:
   a channel control unit that controls communications with the connected one or more host devices;
   a plurality of logical volumes formed on one or more physical storage devices;
   a disk control unit that controls the plurality of logical volumes; and a control memory in which, for each of the plurality of logical volumes, volume discrimination information, ON/OFF information indicating whether an online state exists, and, in the event of an online state, path group information with regard to which host device a subvolume is connected to, are recorded,
   wherein as a result of receiving a specific command from a certain host device, the channel control unit performs, before a target regular volume and target subvolume among the plurality of volumes are paired and data in the target regular volume is copied to the target subvolume, a first examination of whether the target subvolume is in an online state based on the ON/OFF information on the target subvolume, and, when, as a result of this first examination, the target subvolume is known to be in an online state, the channel control unit performs a second examination with regard to which separate host device the target subvolume is connected to based on path group information on the target subvolume, and
   wherein the result of the second examination is sent from the channel control unit to the certain host device.

4. The storage control subsystem according to claim 3, wherein a plurality of volume groups containing two or more logical volumes exist in the plurality of logical volumes,
   wherein volume-group discrimination information for each of the plurality of volume groups and two or more volume discrimination information items corresponding with two or more logical volumes contained in these volume groups are recorded in the control memory,
   wherein the storage control subsystem performs a first examination of whether the two or more subvolumes are in an online state based on two or more ON/OFF information items corresponding with two or more subvolumes in a target subvolume group containing the target subvolume, and
   wherein when it is clear as a result of the first examination that the target subvolume among the two or more subvolumes is in an online state, the storage control subsystem performs the second examination with respect to the target subvolume and sends the result of the second examination to the certain host device.

5. The storage control subsystem according to claim 4, wherein a first examination command that includes volume-group discrimination information on the target subvolume group is received from the certain host device, and, in response to the first examination command, the first examination is performed and the result of the first examination is sent to the certain host device, and
   wherein a second examination command, which includes volume discrimination information on the target subvolume that has been judged as being in an online state based on the first examination result, is received from the certain host device, and, in response to the second examination command, the second examination is performed and the result of the second examination is sent to the certain host device.

6. The storage control subsystem according to claim 4, wherein the ON/OFF information is one-bit information expressed by 1 or 0,
   wherein two or more one-bit information items corresponding with two or more subvolumes included in the target subvolume are included in the first examination result,
   wherein the certain host device stores, for each of the plurality of volume groups, a volume-group discrimination number, and a volume management table in which two or more volume discrimination numbers corresponding with two or more logical volumes contained in the volume group are recorded in this number order, and wherein when an input of a volume discrimination number for the one or more target subvolumes is received from the user, the first examination command that includes the volume discrimination number of the target subvolume group containing the target subvolume is generated and sent to the storage control subsystem, and, when the first examination result is received in response to this first examination command, it is judged whether the one or more target subvolumes is online on the basis of the two or more one-bit information items included in the first examination result, the one or more volume discrimination numbers inputted by the user, and the volume management table; and, when it is judged that at least one target subvolume is in the online state, the second examination command is generated for the target subvolume and then sent to the storage control subsystem.

7. The storage control subsystem according to claim 3, wherein, when the certain host device issues a copy command after volume discrimination information for the target regular volume and volume discrimination information on the target subvolume have been input by the user and/or issues a recopy command for copying once the paired state of the target regular volume and target subvolume has been cancelled and the paired state then reformed, wherein an examination command that includes volume discrimination information on the target subvolume is generated and sent to the storage control subsystem, and wherein the first and second examinations are performed before the target regular volume and the target subvolume are paired and data in the target regular volume is copied to the target subvolume.

8. The storage control subsystem according to claim 3, wherein the certain host device receives a copy instruction from the user and issues a copy command in response to the copy instruction after volume discrimination information for the target regular volume and volume discrimination information on the target subvolume have been inputted by the user and/or issues a recopy command for copying once the paired state of the target regular volume and target subvolume has been cancelled and the paired state then reformed, and wherein when the storage control subsystem receives the copy command or recopy command, before executing copy processing on the basis of the command, the storage control subsystem performs a first examination by referencing ON/OFF information corresponding with discrimination information on the target subvolume that is included in this command, executing copy processing based on the copy command or recopy command upon judging that the target subvolume is in the offline state as a result of the first examination but, on the other hand, executing the second examination upon judging that the target subvolume is in the online state as a result of this first examination.

9. The storage control subsystem according to claim 3, wherein, instead of or in addition to performing the second examination, the storage control subsystem switches the target subvolume from the online state to the offline state when it is judged that the target subvolume is in the online state as a result of the first examination.

10. The storage control subsystem according to claim 9, wherein the storage control subsystem switches the target subvolume from the online state to the off line state in at least one of cases (1) to (3) below:
   (1) when a setting cancellation command that includes discrimination information on the target subvolume is received from the certain host device after the second examination result is sent to the certain host device;
   (2) when path group information corresponding with the target subvolume is referenced, an inquiry is made with regard to whether the connection thereof with all or part of one or more separate host devices specified based on the path group information may be cancelled, and a reply relaying that the connection may be cancelled is then obtained in response to this inquiry; and
   (3) when a predetermined time has elapsed after judging that the target subvolume is in an online state.

11. The storage control subsystem according to claim 3, wherein, when a separate storage control subsystem is connected to the storage control subsystem, the target regular volume exists in the storage control subsystem and the target subvolume exists in the separate storage control subsystem, wherein the separate storage control subsystem references the control memory in the storage control subsystem, performs the first and second examinations, and sends the results of the first and second examinations to the certain host device.

12. A storage control subsystem connected to one or more host devices, comprising:
   a control unit;
   a plurality of logical volumes formed on one or more physical storage devices; and
   a control memory in which, for each of the plurality of logical volumes, volume discrimination information, ON/OFF information indicating whether an online state exists, and, in the event of an online state, path group information with regard to which host device(s) a subvolume is connected to, are recorded,
   wherein, as a result of receiving a specific command from a certain host device, the control unit performs, before a target regular volume and target subvolume among the plurality of volumes are paired and data in the target regular volume is copied to the target subvolume, a first examination of whether the target subvolume is in an online state on the basis of the ON/OFF information on the target subvolume, and, when as a result of this first examination, the target subvolume is known to be an online state, the control unit performs a second examination with regard to which separate host device the target subvolume is connected to based on path group information on the target subvolume, and
   wherein the result of the second examination is sent from the control unit to the certain host device.

* * * * *